United States Patent [19]
Matsuoka

(10) Patent No.: US 6,646,592 B2
(45) Date of Patent: Nov. 11, 2003

(54) PULSE RADAR DEVICE

(75) Inventor: Katsuji Matsuoka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/292,588

(22) Filed: Nov. 13, 2002

(65) Prior Publication Data

US 2003/0151545 A1 Aug. 14, 2003

(30) Foreign Application Priority Data

Feb. 14, 2002 (JP) .................................. 2002-036252

(51) Int. Cl.[7] .................... G01S 13/10; G01S 13/08
(52) U.S. Cl. ....................... 342/134; 342/118; 342/145; 342/202
(58) Field of Search ............................. 342/118, 134, 342/145, 135, 70

(56) References Cited

U.S. PATENT DOCUMENTS

| 5,047,780 | A | * | 9/1991 | Dijkstra | 342/145 |
| 5,389,932 | A | * | 2/1995 | Ota et al. | 342/202 |
| 5,686,921 | A | * | 11/1997 | Okada et al. | 342/134 |
| 6,239,741 | B1 | * | 5/2001 | Fontana et al. | 342/135 |

FOREIGN PATENT DOCUMENTS

| JP | 07-072237 | 3/1995 |
| JP | 10-062518 | 3/1998 |

OTHER PUBLICATIONS

W. Weidmann and D. Steinbuch "A High Resolution Radar for Short Range Automotive Applications", 28TH European Microwave Conference Amsterdam, 1998.

* cited by examiner

Primary Examiner—Ian J. Lobo
(74) Attorney, Agent, or Firm—Sughrue Mion, PLLC

(57) ABSTRACT

A pulse radar device includes a transmitting unit, a receiving unit, a first integrating unit for sampling a reception signal at predetermined time intervals from transmission and integrating results of a predetermined number of times of the sampling at each sampling timing, a differential operating unit for, each time a predetermined time period has passed, reading results of the integrating at each sampling timing and differentiating the read results of the integrating in a sampling direction, a second integrating unit for integrating absolute values of a predetermined number of outputs from the differential operating unit at each sampling timing, a peak detecting unit for detecting the peak of an output from the second integrating unit, a distance measuring and detecting unit for calculating a distance to an object and judging presence or absence of an object based on an output from the peak detecting unit and the like.

20 Claims, 22 Drawing Sheets

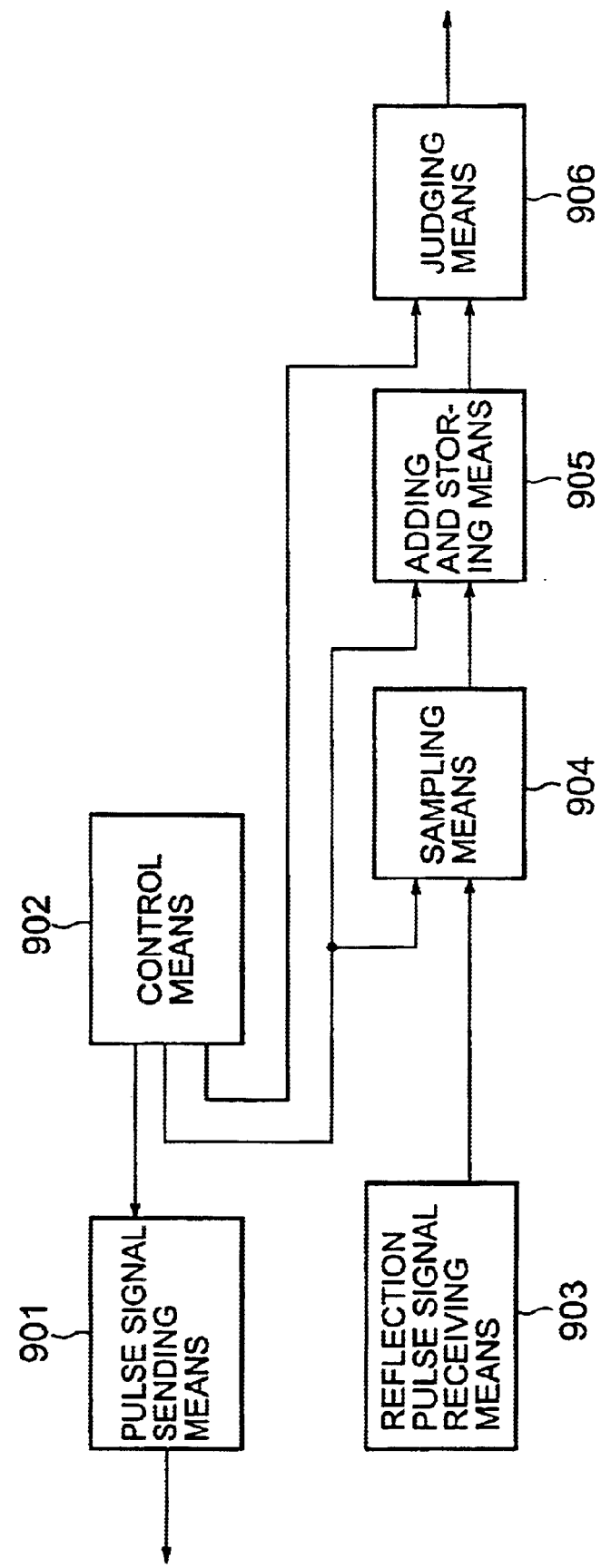

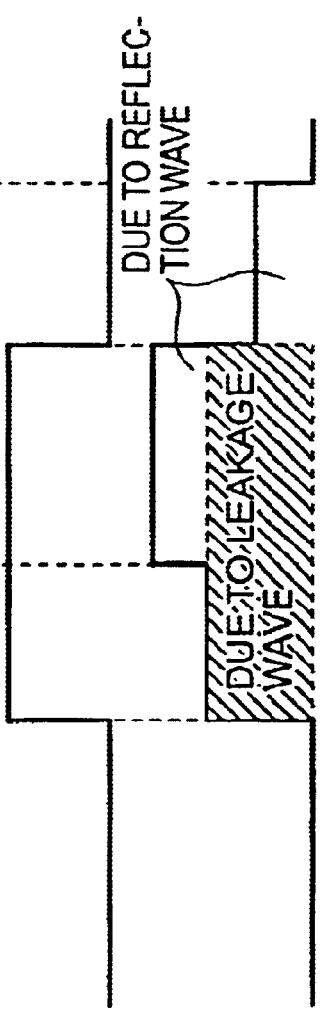

PULSE RADAR DEVICE

BACKGROUND OF THE INVENTION

1. Field of the Invention

The present invention relates to a pulse radar device that detects presence or absence of an object and measures a distance to the detected object by transmitting a radio wave and receiving a reflection wave generated by the reflection of the transmitted radio wave by the object.

2. Description of the Related Art

A conventional pulse radar device will be described with reference to the drawings. FIG. 21 shows the construction of a conventional pulse radar device that is, for instance, disclosed in Japanese Patent Laid-Open No. 07-072237.

As shown in FIG. 21, this pulse radar device periodically outputs a pulse-shaped signal using a pulse signal sending means 901. Then, the pulse radar device continuously receives a reflection pulse from an object using a reflection pulse signal receiving means 903 and converts the reflection pulse into a binary signal using a binarization means (not shown) Then, after a sending timing of the sending means 901, a sampling means 904 obtains a sampling value of "0" or "1" by sampling the binary signal at one fixed sampling point or at each of plural sampling points and gives this sampling value to an adding and storing means 905 corresponding to each sampling point.

On receiving the sampling value, the adding and storing means 905 adds the sampling value of "0" or "1" in accordance with a predetermined number of times of signal sending by the sending means 901. After the addition is performed a predetermined number of times, a judging means 906 divides a value obtained as a result of addition by each adding and storing means 905 by the number of times of addition to obtain a normalized addition value, compares the normalized addition value with a predetermined threshold value, judges whether there exists a reflection signal from an external object based on the magnitude of the normalized addition value, and judges the presence or absence of the external object based on a result of this judgment.

However, in the case where the isolation between the transmission and the reception is low such that there exists a so-called leakage waveform, or in the case where there exists a radome, it becomes difficult to detect an object, which is less than 10 m away, and to measure a distance to the object using the device described above due to the reasons given below.

That is, in the conventional device described above, its transmission pulse width is 66.7 ns corresponding to a distance of 10 m. Consequently, in the case where an object is less than 10 m away, there is detected a waveform in which a leakage waveform or a waveform in which the waveform of a reflection wave generated by a secondary radome is superimposed on the waveform of a reflection wave from the object, as shown in FIGS. 22A to 22D. As a result, if a threshold value is set based on a reception level during non-transmission, that is, based on a so-called noise level, there is detected only the rising of the leakage waveform and there occurs a problem in that it is impossible to detect the rising of the reflection wave that should be actually detected.

As a measure against such a problem, a method, with which a pulse width is extremely reduced to 350 ps or the like, is proposed in a document of 1998 (W. Weidmann and D. Steinbuch, "High Resolution Radar for Short Range Automotive Applications", 28th European Microwave Conference Amsterdam, 1998). There is also proposed a method, with which a leakage waveform is canceled out by utilizing a transmission waveform, in JP 10-62518 A.

If the transmission pulse width is reduced to 350 ps as described in the document described above, the aforementioned problem is solved because a leakage waveform and the waveform of a reflection wave are superimposed on each other only in the case where the distance to an object is around 5 cm or shorter. However, its occupation band width is extremely widened, so that there occurs a problem in that it is impossible to use this method within the limits of the existing radio law.

Also, in the case where a leakage waveform is canceled out by utilizing a transmission waveform with the method described in Japanese Patent Laid-Open No. 10-062518, it is difficult to cope with a difference in time intervals from transmission to the reception of a leakage waveform resulting from an individual difference or a difference of the use condition, a difference in the magnitude of the leakage waveform, and the like. This results in a problem in that it is required to perform adjustment in accordance with the circumstances.

SUMMARY OF THE INVENTION

The present invention has been made to solve the problems described above, and an object of the present invention is to provide a pulse radar device that is capable of correctly detecting an object within limits of existing radio law even if there exists a leakage signal between transmission and reception or there exists a reflection signal from a target, such as radome, fixed onto the pulse radar device. To do so, the pulse radar device utilizes a fact that a reception signal is changed if a phase difference between a leakage signal between transmission and reception and a reflection signal from a moving target is changed or a phase difference between a reflection signal from a target, such as radome, fixed onto the radar device and a reflection signal from a moving target is changed, as shown in FIG. 1.

According to the present invention, there is provided a pulse radar device including a transmitting means for transmitting a pulse-shaped radio wave and a receiving means for receiving a reflection wave generated by reflection of the radio wave transmitted from the transmitting means by an object.

The pulse radar device according to the present invention further includes a comparator means for converting a reception signal from the receiving means into a binary signal by comparing the reception signal with a preset and predetermined level and a first integrating means for sampling an output from the comparator means at predetermined time intervals from transmission and integrating results of a predetermined number of times of the sampling at each sampling timing.

The pulse radar device according to the present invention further includes a differential operating means for, each time a predetermined time period has passed, reading results of the integrating by the first integrating means at each sampling timing and differentiating the read results of the integrating in a sampling direction and a second integrating means for integrating absolute values of a predetermined number of outputs from the differential operating means at each sampling timing.

The pulse radar device according to the present invention still further includes a peak detecting means for detecting a peak based on an output from the second integrating means, a distance measuring and detecting means for calculating a distance to the object and judging presence or absence of the object based on an output from the peak detecting means and a timing control means for performing timing control for the transmission of the radio wave, the reception of the reflection wave, and signal processing.

Therefore, the pulse radar device according to the present invention is capable of correctly detecting an object even if there exists a so-called leakage signal component.

BRIEF DESCRIPTION OF THE DRAWINGS

In the accompanying drawings:

FIG. 21 is a block diagram showing the construction of a conventional pulse radar device; and FIGS. 22A to 22D illustrate a leakage wave and a reflection wave of the conventional pulse radar device.

DETAILED DESCRIPTION OF THE PREFERRED EMBODIMENTS

First Embodiment

Figure 2:
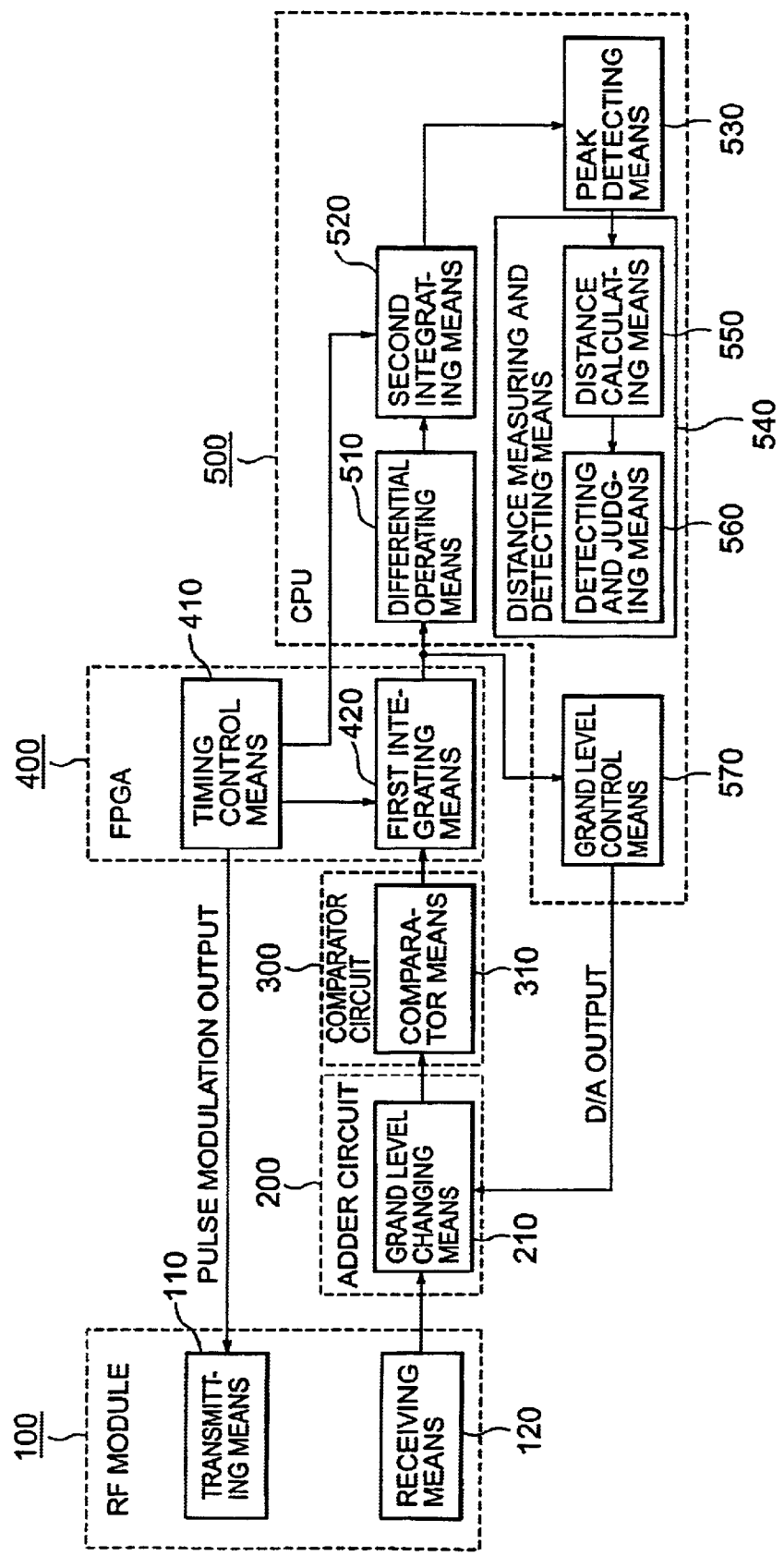
FIG. 2 shows a construction of a pulse radar device according to the first embodiment of the present invention.

A pulse radar device according to a first embodiment of the present invention will be described with reference to the drawings. FIG. 2 shows the construction of the pulse radar device according to the first embodiment of the present invention. Note that the same reference numerals in respective drawings denote the same or equivalent portions.

In FIG. 2, the pulse radar device in this first embodiment is constituted of five major portions that are an RF module 100, an adder circuit 200, a comparator circuit 300, an FPGA (field programmable gate array) 400, and a CPU 500.

Also, in this drawing, the RF module 100 includes a transmitting means 110 that transmits a pulse-shaped electromagnetic wave (whose center frequency is 24.125 GHz) having a predetermined width (96 ns, for instance) at fixed periods (1024 ns, for instance), and a receiving means 120 that receives a reflection wave generated by the reflection of the electromagnetic wave by a target object in the periphery.

Also, in this drawing, the adder circuit 200 includes a ground level changing means 210 that changes the ground level based on a designation from the CPU 500 to be described later so that there occurs no saturation of a signal received by the receiving means 120.

Further, in this drawing, the comparator circuit 300 includes a comparator means 310 that converts an output from the ground level changing means 210 into a binary signal.

Also, in this drawing, the FPGA 400 includes a timing control means 410 and a first integrating means 420.

Also, in this drawing, the CPU 500 realizes a differential operating means 510, a second integrating means 520, a peak detecting means 530, a distance measuring and detecting means 540 having a distance calculating means 550 and a detecting and judging means 560, and a ground level control means 570.

Figure 3:
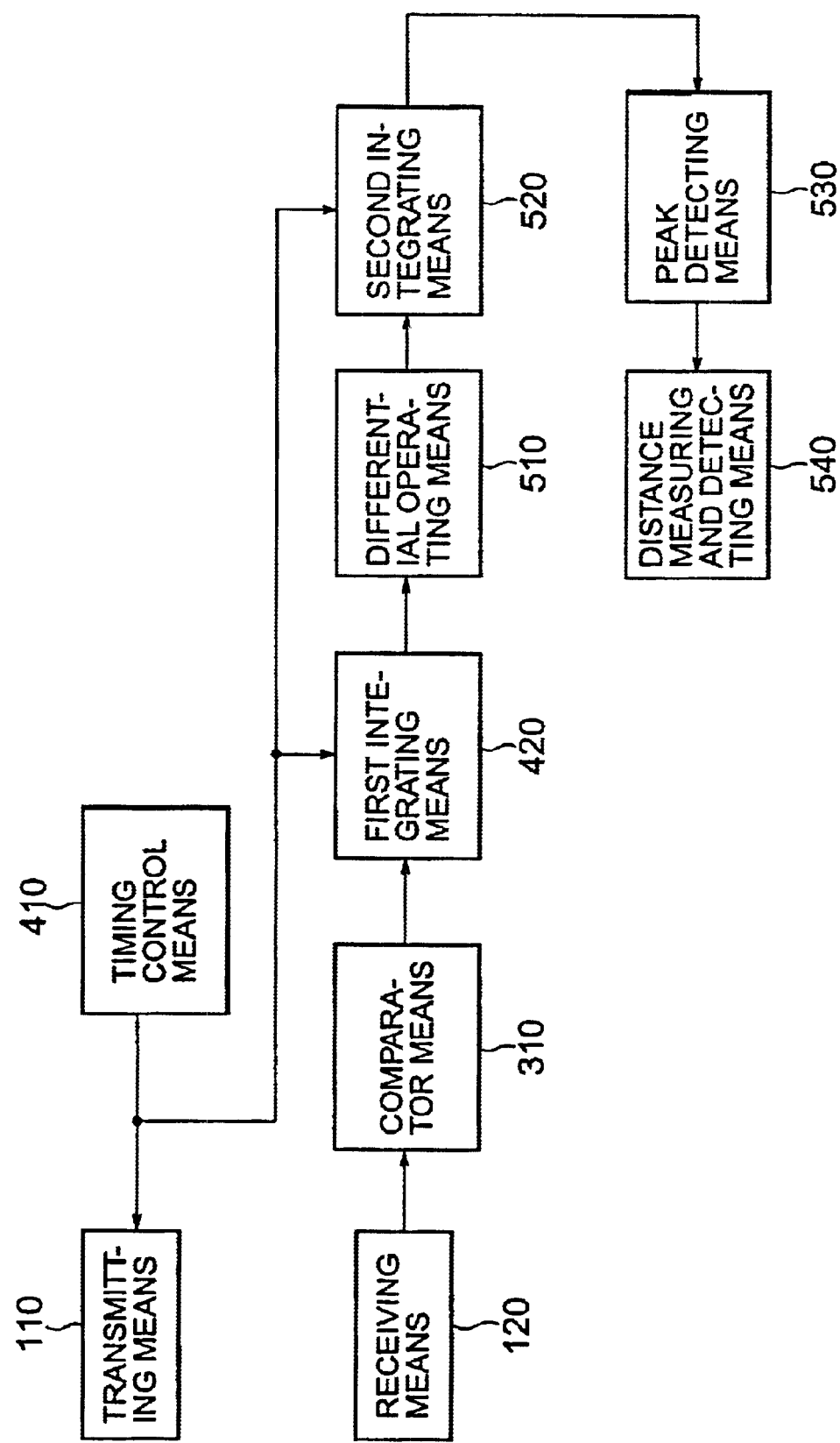
FIG. 3 is a block diagram showing the construction of the pulse radar device according to a first embodiment of the present invention.

FIG. 3 is a block diagram showing the construction of the pulse radar device according to the present invention.

In FIG. 3, reference numeral 110 denotes a transmitting means for transmitting a pulse-shaped radio wave, numeral 120 a receiving means for receiving a reflection wave generated by the reflection of the radio wave transmitted from the transmitting means 110 by a plurality of objects and outputting a reception signal, numeral 310 denotes a comparator means for converting the signal from the receiving means 120 into a binary signal by comparing the signal from the receiving means 120 with a preset and predetermined level, numeral 420 denotes a first integrating means for sampling an output from the comparator means 310 at predetermined time intervals from transmission and integrating results of a predetermined number of times of the sampling at each sampling timing, numeral 510 denotes a differential operating means for, each time a predetermined time period has passed, reading results of the integrating by the first integrating means 420 at each sampling timing and differentiating the read results of the integrating in a sampling direction, numeral 520 denotes a second integrating means for integrating absolute values of a predetermined number of outputs from the differential operating means 510 at each sampling timing, numeral 530 denotes a peak detecting means for detecting a peak based on an output from the second integrating means 520, numeral 540 denotes a distance measuring and detecting means for calculating a distance to a target and judging the presence or absence of a target based on an output from the peak detecting means 530, and numeral 410 denotes a timing control means for performing timing control for the transmission of a radio wave, the reception of a radio wave, and signal processing.

Figure 4:
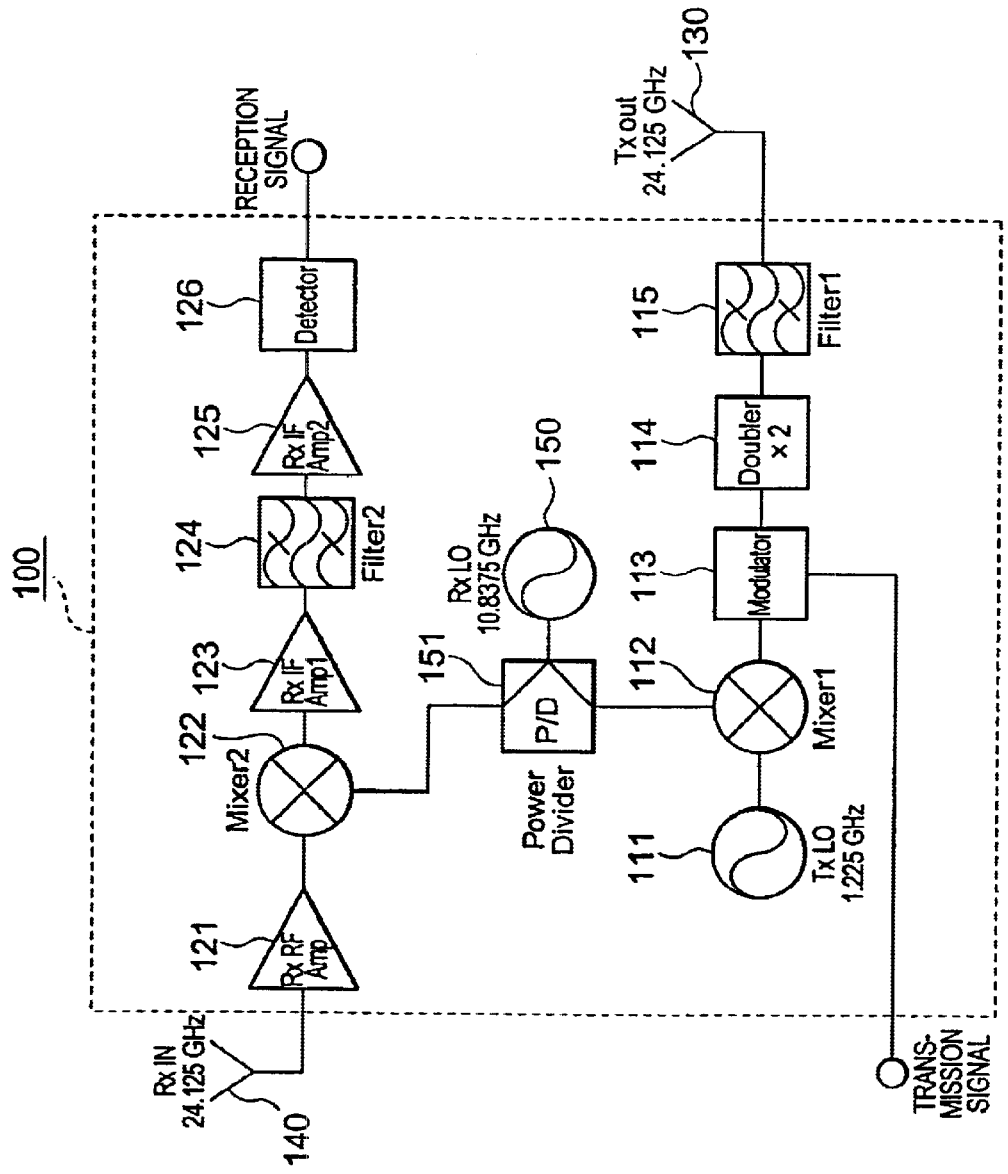
FIG. 4 shows a construction of an RF module of the pulse radar device according to the first embodiment of the present invention.

FIG. 4 shows the construction of the RF module of the pulse radar device according to this first embodiment.

A signal of 10.8375 GHz generated by an oscillator 150 (RXLO) is mixed with a signal of 1.225 GHz generated by an oscillator 111 (TxLO) by a mixer 112 (Mixer1) and is converted into a pulse-shaped signal by a modulator 113 (Modulator) based on a transmission signal. This pulse-shaped signal is multiplexed by two by the following doubler 114 (Doubler), is converted into a signal of 24.125 GHz by the following filter 115 (Filter1), and is radiated to the outside from an antenna 130 (Tx antenna) as a radio wave.

After being reflected by an external object, the radio wave is received by an antenna 140 (Rx antenna), is amplified by an amplifier 121 (RxRFAmp), is mixed with a signal from the oscillator 150 (RxLO) by a mixer 122 (Mixer2), is reduced down to an intermediate frequency, passes through an amplifier 123 (RxIFAmp1), a filter 124 (Filter2), and an amplifier 125 (RxIFAmp2), is envelope-detected by a detector 126 (Detector), and becomes a reception signal.

Figure 5:
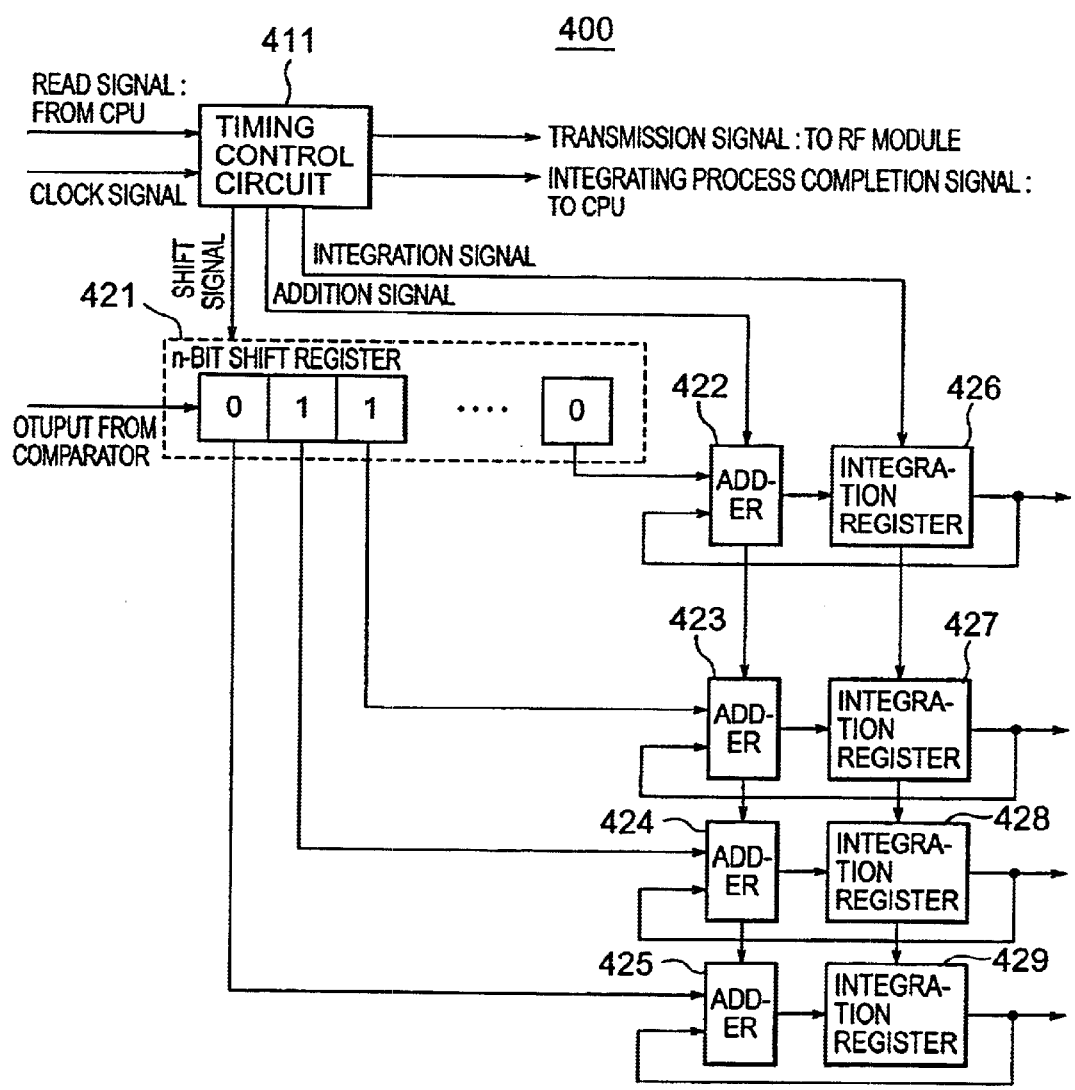
FIG. 5 shows a construction of an FPGA of the pulse radar device according to the first embodiment of the present invention.

FIG. 5 shows the construction of the FPGA of the pulse radar device according to this first embodiment.

In FIG. 5, this FPGA 400 includes a timing control circuit 411, a shift register 421, adders 422 to 425 that each correspond to one of bits of the shift register 421, and integration registers 426 to 429.

The timing control circuit 411 generates, on the basis of a clock signal (125 MHHZ=8 ns period, for instance) generated by an oscillator connected to the outside of the FPGA 400, a transmission signal (whose width is 96 ns and period is 1024 ns, for instance) for turning on/off the radiation of an electromagnetic wave from the transmitting means 110, a shift signal for notifying the shift register 421 to be described later of a timing at which a bit-shift operation should be performed, an addition signal for notifying the adders 422 to 425 of an addition timing, an integration signal for notifying the integration registers 426 to 429 of a timing at which the outputs from the adders 422 to 425 should be held, and an integrating process completion signal for notifying the CPU 500 of the completion of an integrating process.

The shift register 421 stores binary data outputted from the comparator circuit 300 while shifting the binary data one-bit by one-bit based on the shift signal from the timing control circuit 411. The adders 422 to 425 add respective bits of the binary data ("0" or "1") to the contents of the integration registers 426 to 429 in accordance with the addition signal from the timing control circuit 411. The integration registers 426 to 429 hold the outputs from the adders 422 to 425 as integration data and outputs the contents of the registers on receiving a request from the CPU 500.

Next, an operation of this FPGA will be described with reference to FIGS. 6A to 6F. FIGS. 6A to 6F are a timing chart showing an operation of the FPGA of the pulse radar device according to this first embodiment.

Figure 6:
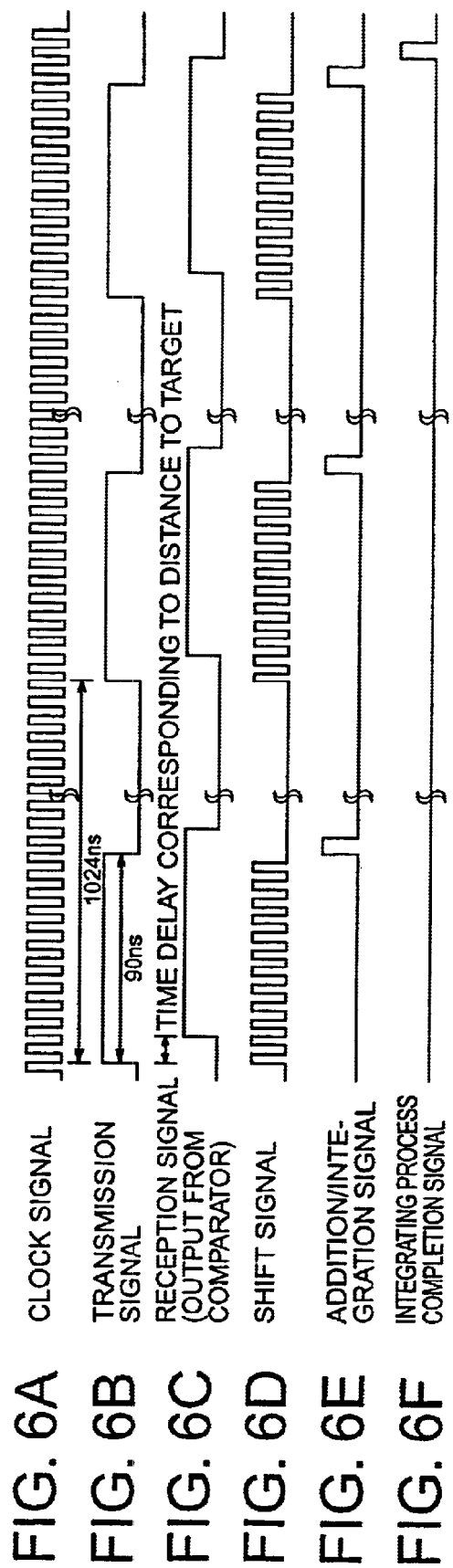
FIGS. 6A to 6F are each a timing chart showing an operation performed by the FPGA of the pulse radar device according to the first embodiment of the present invention.

First, a transmission signal shown in FIG. 6B is raised and is then lowered after 10 clocks based on an external clock signal shown in FIG. 6A. Concurrently with the rising of the transmission signal, a shift signal shown in FIG. 6D synchronized with the clock signal is outputted, with the number of bits of the outputted shift signal being the same as the number of bits of the shift register 421. On the basis of this shift signal, the shift register 421 holds binary data outputted from the comparator circuit 300 in each bit thereof.

Following this, after there is outputted a shift signal whose number of bits is the same as the number of bits of the shift register 421, there is outputted an addition/integration signal shown in FIG. 6E. On the basis of this signal, each of the adders 422 to 425 and the integration registers 426 to 429 performs the holding of addition data and integration data. Following this, after this operation is repeated a predetermined number of times (1000 times, for instance), an integrating process completion signal shown in FIG. 6F is outputted to the CPU 500. On receiving this integrating process completion signal, the CPU 500 reads the contents of each of the integration registers 426 to 429.

Figure 7:
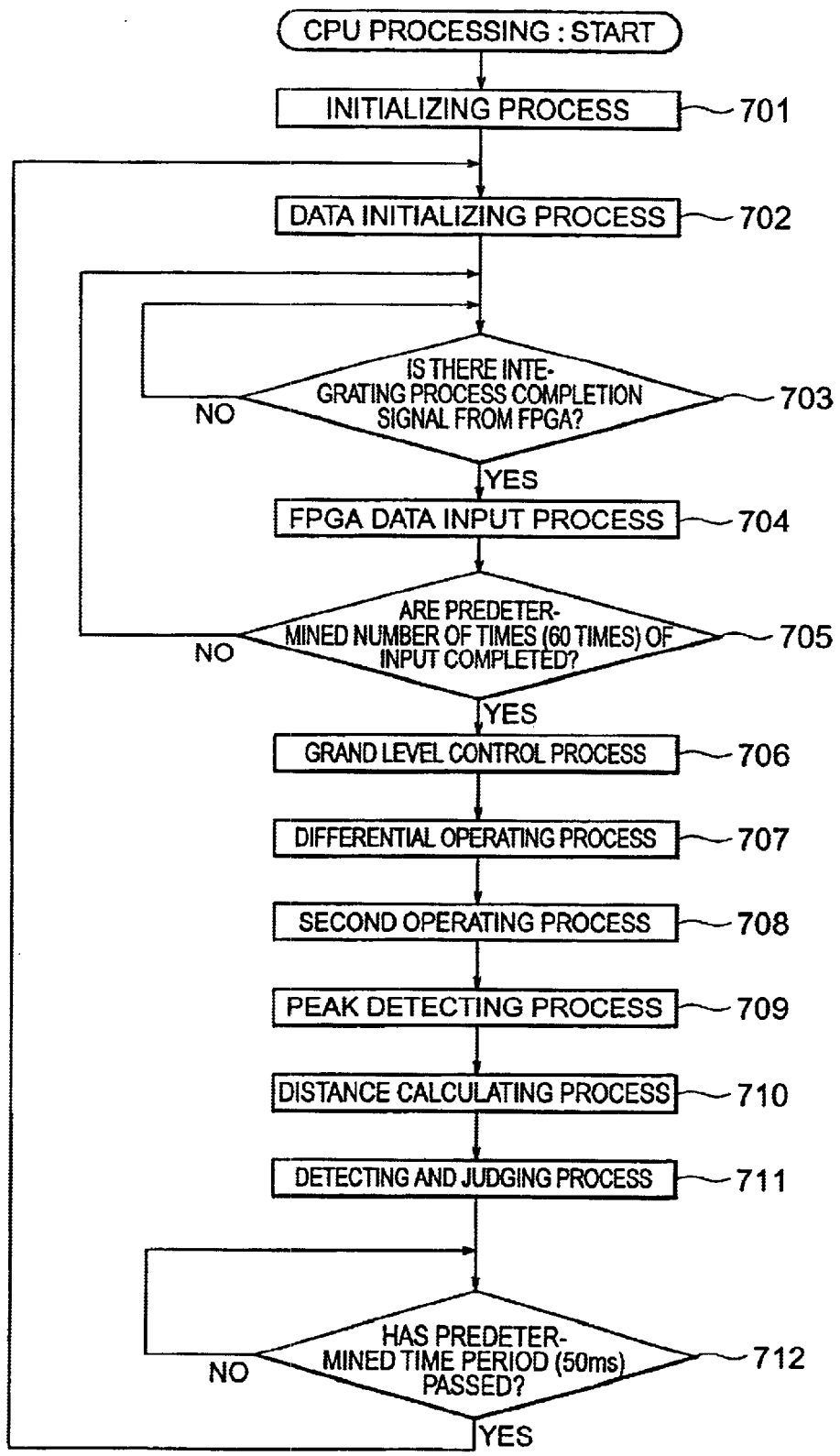
FIG. 7 is a flowchart showing an operation performed by a CPU of the pulse radar device according to the first embodiment of the present invention.

FIG. 7 is a flowchart showing the processing performed by the CPU of the pulse radar device according to this first embodiment.

First, in Step 701, the CPU performs the initialization of the inside of the CPU as shown in FIG. 7.

Following this, in Steps 702 and 703, after there is performed the initialization of data, there is waited for an integrating process completion signal to be sent from the FPGA 400.

Next, in Step 704, on receiving the integrating process completion signal from the FPGA 400, the integration results at each sampling timing are stored in a two-dimensionally arranged FPGA [i] [j]. Here, "i" is the sampling timing (i=0 to N; N is the number of bits of the shift register 421), and "j" is the order of storage (j=0 to 59; in the case where the number of integrating operations by the second integrating means 520 is set as 60).

Next, in Steps 705 to 711, if the number of times of reception of the integrating process completion signal from the FPGA 400 reaches a predetermined number of times (60 times, in this example), there are performed ground level control process (Step 706), a differential operating process (Step 707), a second integrating process (Step 708), a peak detecting process (Step 709), a distance calculating process (Step 710), and a detecting and judging process (Step 711).

Following this, in Step 812, it is confirmed whether there has passed 50 ms that is a processing period and, if the confirmation result is affirmative, the processing returns to Step 702 and the same operation is repeated.

The ground level control process will be described in more detail.

Figure 8:
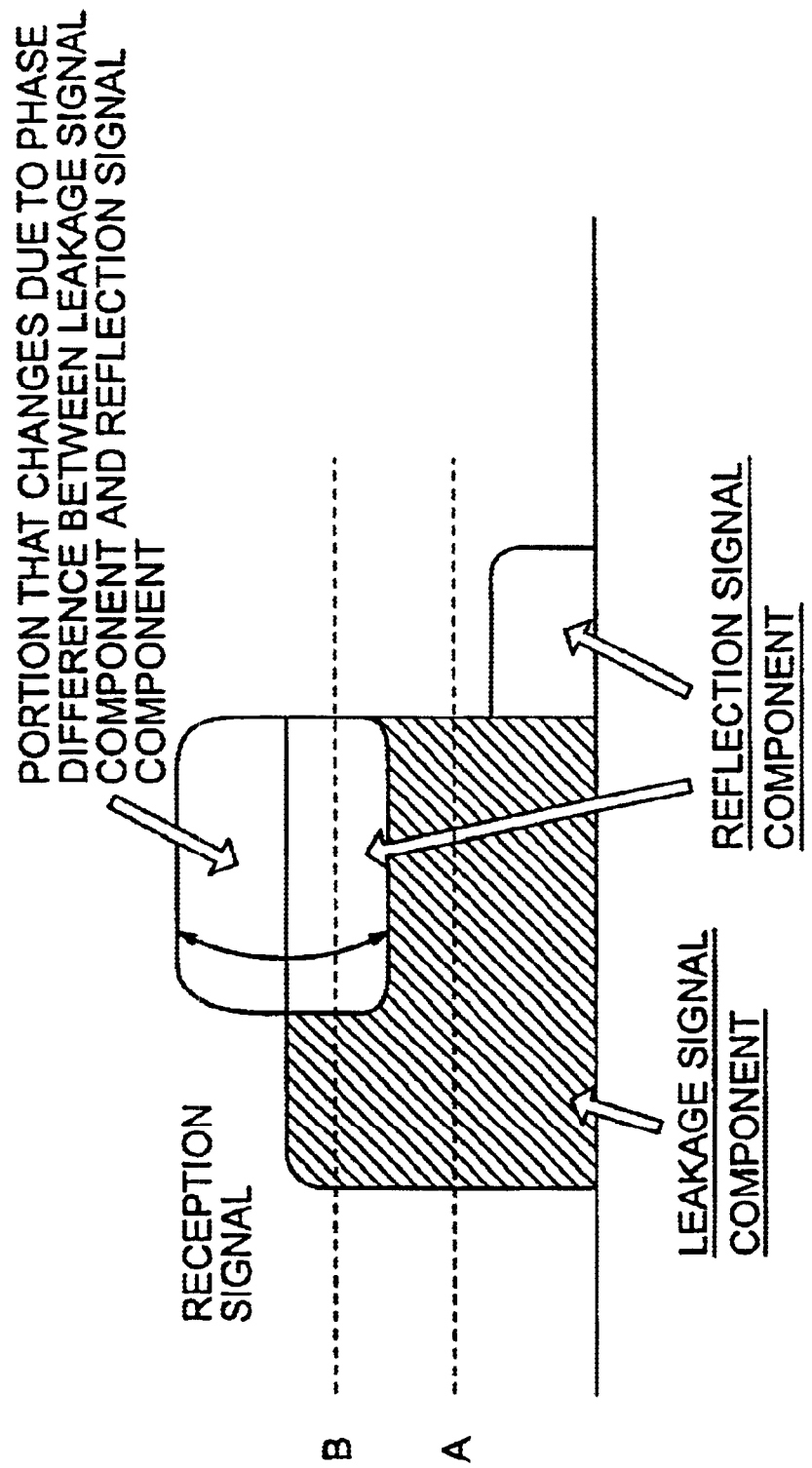
FIG. 8 shows a ground level control operation performed by the CPU of the pulse radar device according to the first embodiment of the present invention.
Figure 9:
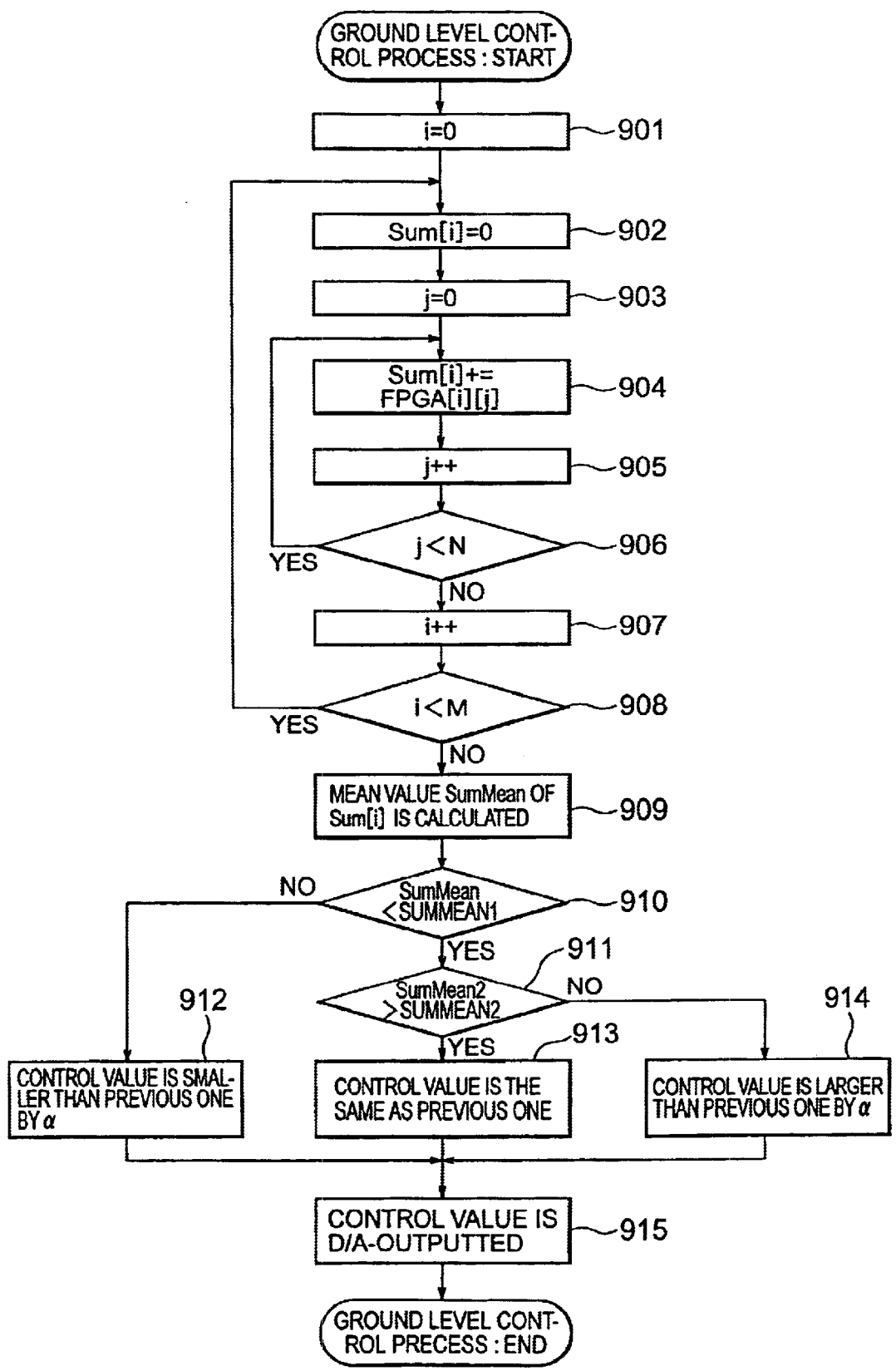
FIG. 9 is a flowchart showing a ground level control process performed by the pulse radar device according to the first embodiment of the present invention.

FIG. 8 illustrates ground level control. Also, FIG. 9 is a flowchart showing an operation during the ground level control process performed by the CPU of the pulse radar device according to this first embodiment.

As shown in FIG. 8, in the case where binarization is performed by setting a threshold value at a position A in this drawing, there is obtained a signal of "1" at all times irrespective of the presence or absence of an object in the periphery, which means that it is impossible to perform object detection. The ground level control process is a process where the ground level of a reception signal is adjusted in order to raise or lower the reception signal in its entirety, thereby displacing the threshold value to a position B in the drawing.

In Steps 901 to 908, there is obtained a sum "Sum [i]" of integration values obtained by performing the integrating 60 times at each sampling timing.

Next, in Step 909, there is calculated a mean value "SumMean" of the sum "Sum [i]" of the integration values obtained at each sampling timing.

Next, in Steps 910 to 914, the mean value "SumMean" is compared with a preset value "SUMMEAN1" and, in the case where SUMMEAN1 is smaller than the mean value, a designation value (control value) to the adder circuit 200 that is the ground level changing means 210 is reduced in Step 912. On the other hand, in the case where SUMMEAN1 is greater than the mean value, SumMean2 and SUMMEAM2 (note that SUMMEAM1>SUMMEAM2) are compared with each other in Step 911 and, in the case where SUMMEAN2 is greater than the SumMean2, the designation value (control value) to the adder circuit 200 that is the ground level changing means 210 is increased in Step 914. Also, in the case where SUMMEAN2 is smaller than SumMean2, the processing proceeds to Step 913 in which a previous designation value (control value) is held as it is.

Following this, in Step 915, the designation value (control value) is D/A-converted, is outputted from the CPU 500, and is added to a reception signal by the adder circuit 200, thereby adjusting the ground level of the reception signal. Note that in this first embodiment, the position of the threshold value is adjusted by changing the ground level of the reception signal. However, there occurs no problem even if the threshold value itself is controlled.

Next, the differential operating process (Step 707) and the second integrating process (Step 708) will be described in detail.

Figure 10:
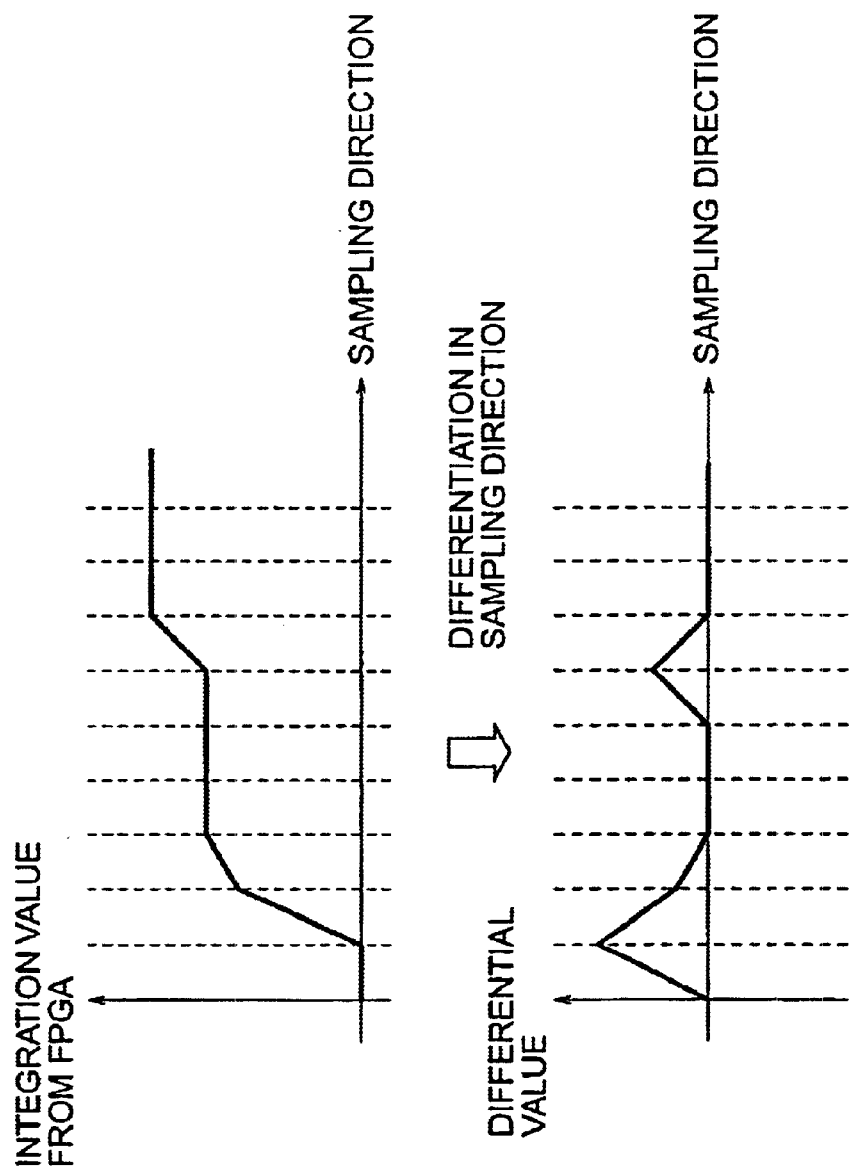
FIG. 10 illustrates a differential operating process performed by the pulse radar device according to the first embodiment of the present invention.
Figure 11:
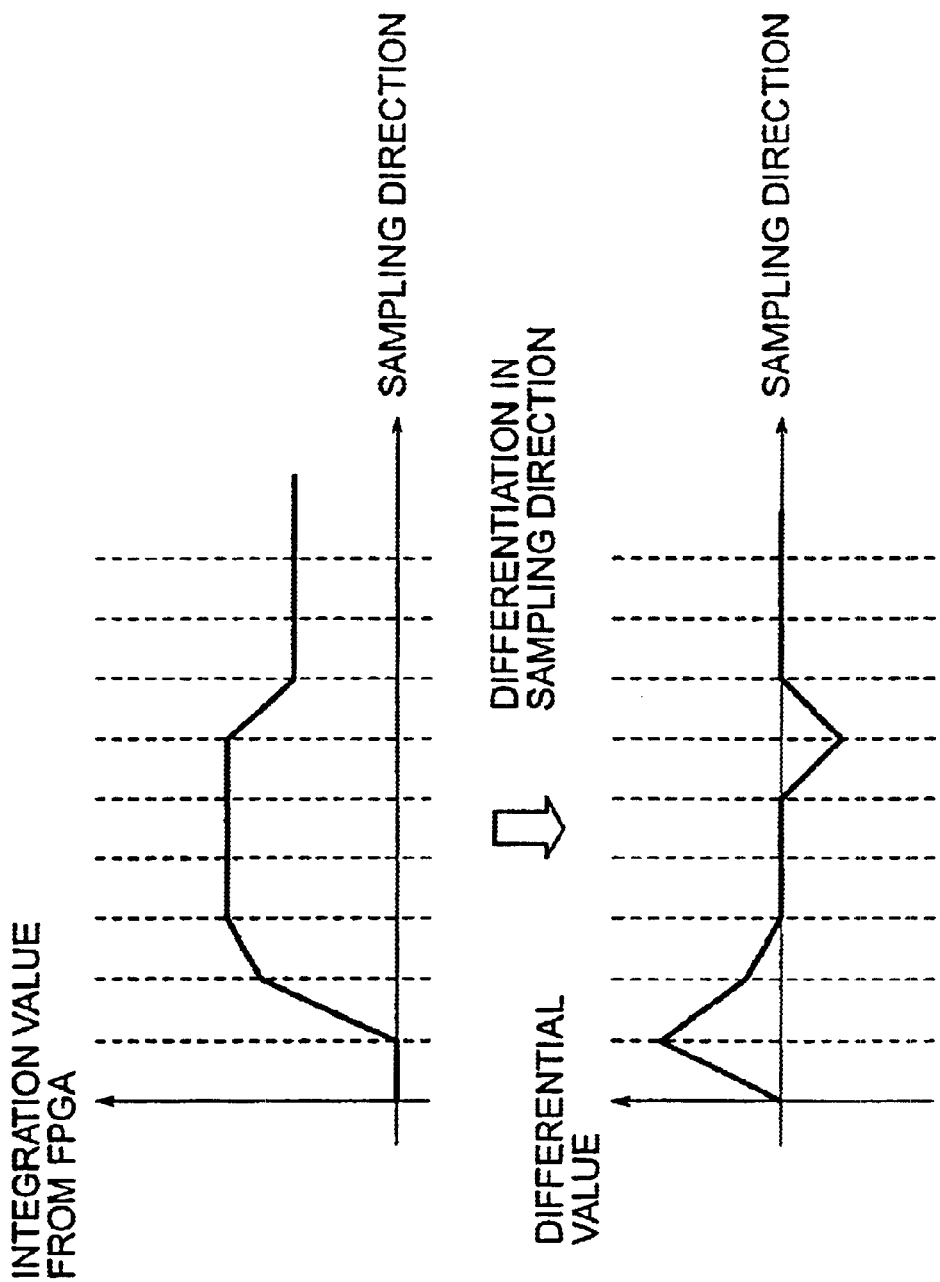
FIG. 11 also illustrates the differential operating process performed by the pulse radar device according to the first embodiment of the present invention.
Figure 12:
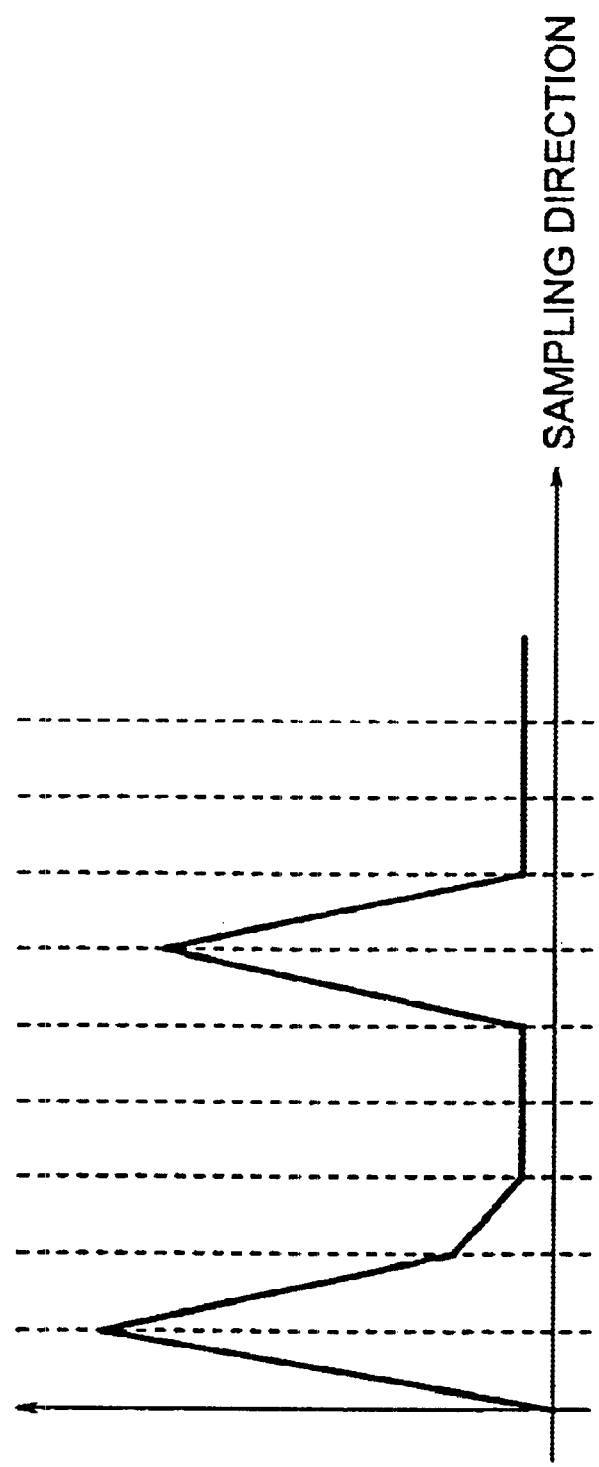
FIG. 12 illustrates a second integrating process performed by the pulse radar device according to the first embodiment of the present invention.

FIGS. 10 and 11 are each a drawing illustrating the differential operating process performed by the CPU of the pulse radar device according to this first embodiment. Also, FIG. 12 is a drawing illustrating the second integrating process performed by the CPU of the pulse radar device according to this first embodiment.

Figure 13:
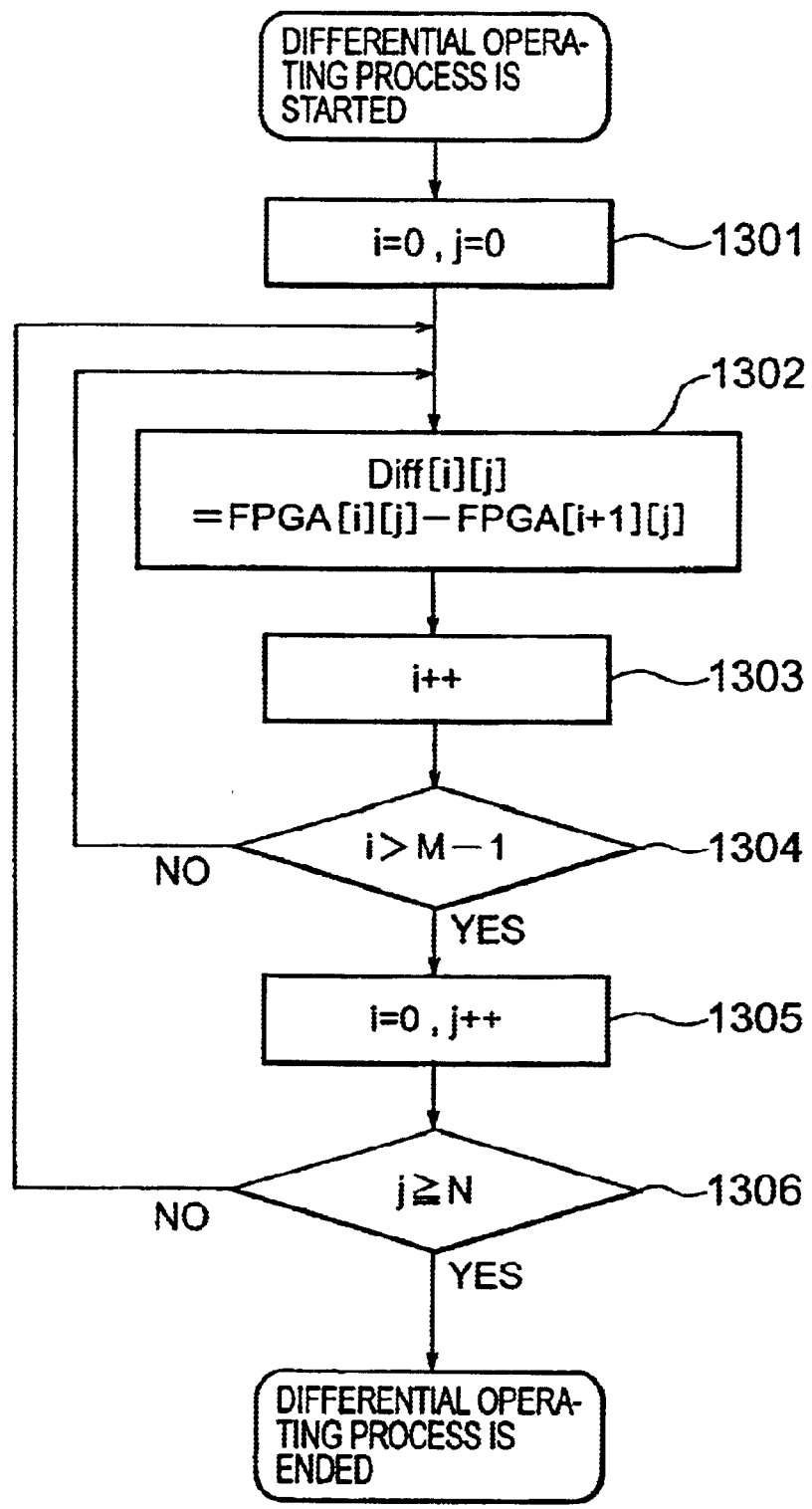
FIG. 13 is a flowchart showing the differential operating process performed by the pulse radar device according to the first embodiment of the present invention.
Figure 14:
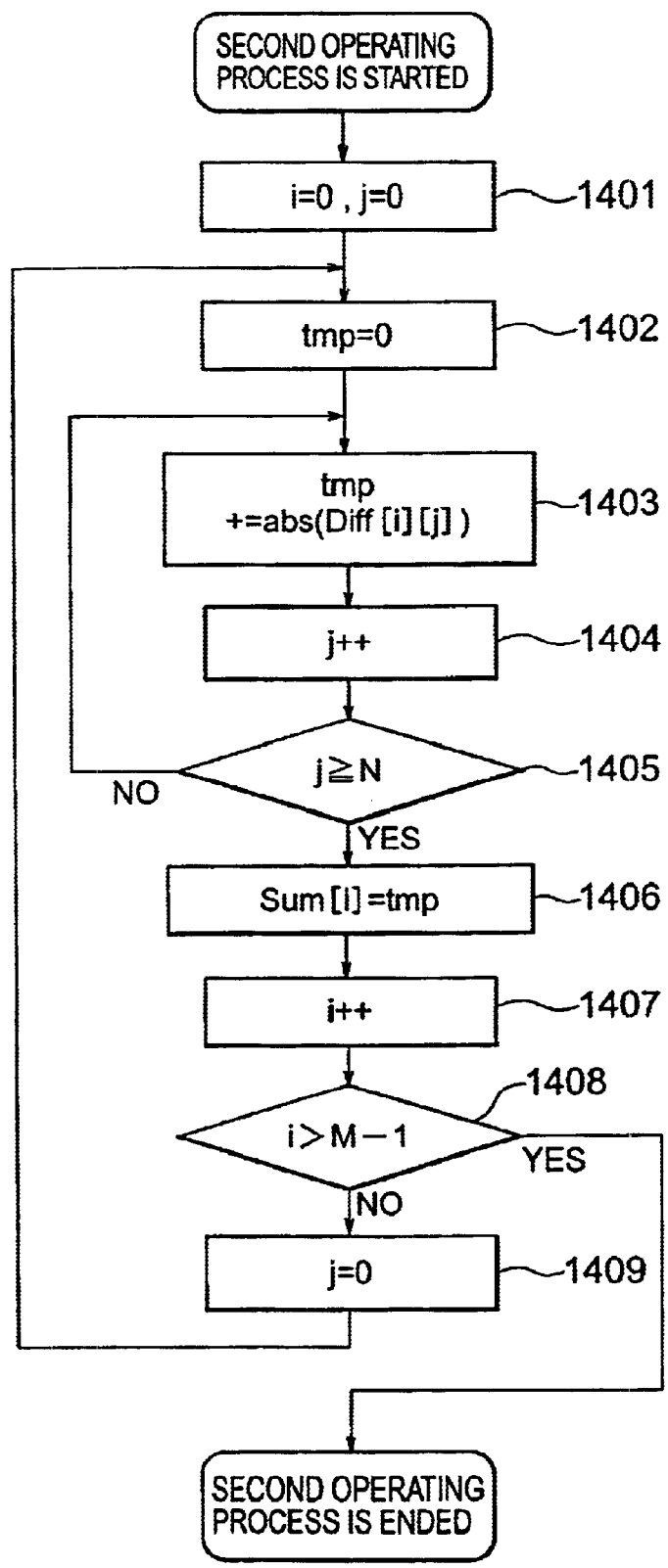
FIG. 14 is a flowchart showing the second integrating process performed by the pulse radar device according to the first embodiment of the present invention.

FIG. 13 is a flowchart showing an operation during the differential operating process performed by the CPU of the pulse radar device according to this first embodiment. Also, FIG. 14 is a flowchart showing an operation performed during the second integrating process by the CPU of the pulse radar device according to this first embodiment.

Figure 1:
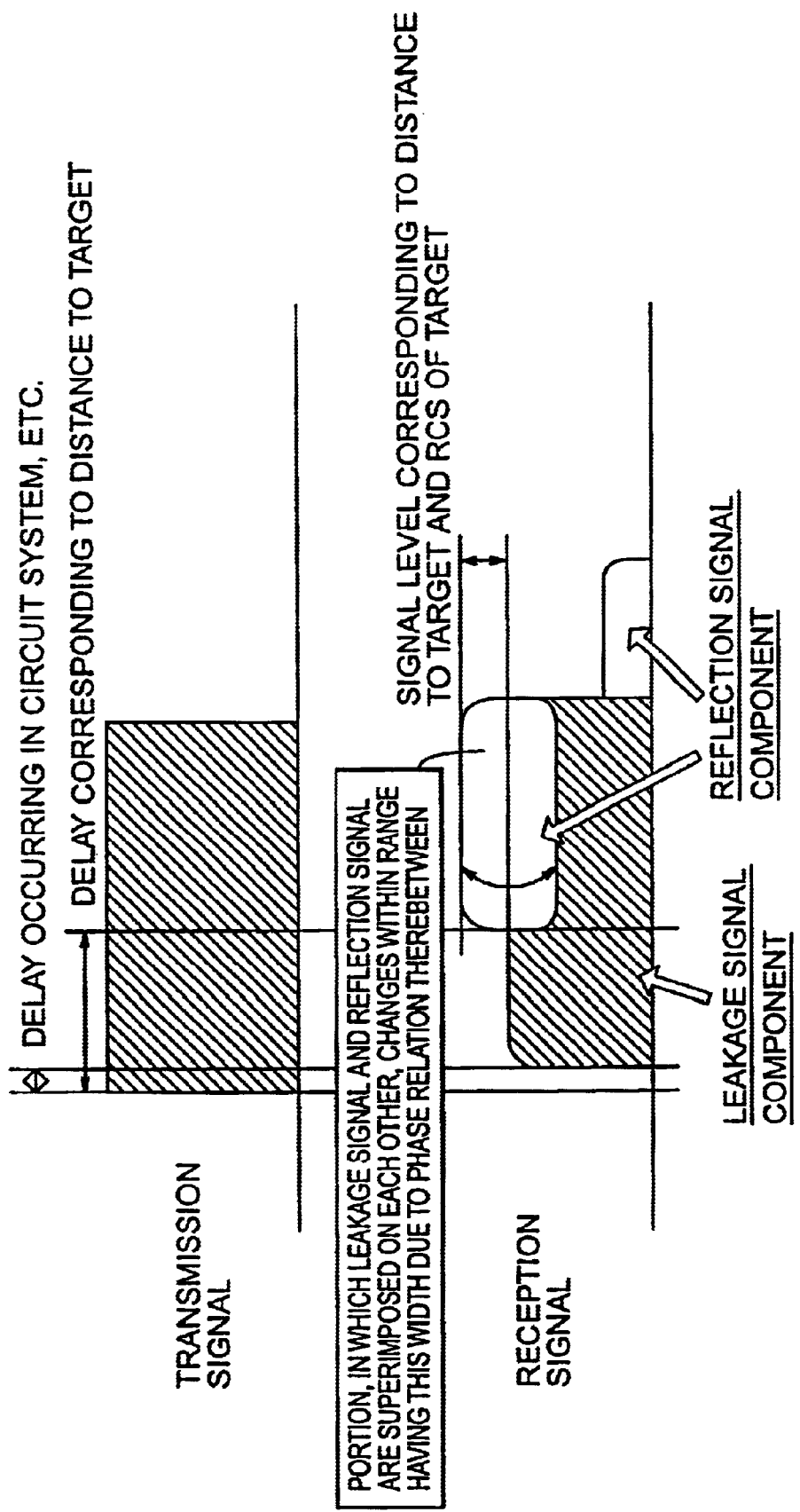
FIG. 1 illustrates how a reception signal changes due to a change of a phase difference in a pulse radar device according to the present invention.

In the case where a relative distance between an object in the periphery and the radar device changes, the magnitude of a signal changes at the sampling timing corresponding to a portion in which a leakage signal component and a reflection signal component from the object in the periphery are superimposed on each other, as shown in FIG. 1. Consequently, integration data from the FPGA 400 (first integrating process) is differentiated in a sampling direction.

That is, if there is obtained a difference between integration data at a sampling timing with interest and integration data at its neighboring sampling timing, in the case where the leakage signal component and the reflection signal component from the object in the periphery strengthen each other, a result shown in FIG. 10 is obtained.

On the other hand, in the case where the leakage signal component and the reflection signal component from the object in the periphery weaken each other, a result shown in FIG. 11 is obtained. Accordingly, in the case where the relative distance between the object in the periphery and the radar changes, a differential value changes from a positive side to a negative side or from a negative side to a positive side.

Accordingly, if the absolute value of each differential value is integrated, there is obtained a result shown in FIG. 12, so that a peak is obtained from this result and is compared with a preset threshold value. In this manner, there is detected an object in the periphery.

Here, the first peak is generated by the rising of a reception waveform. However, within a close range in which there is exerted an influence of this rising, by setting the threshold value so as to be higher than the first peak, it becomes possible to detect an object in the periphery even within such a close range in which there is exerted an influence of the rising.

In order to realize the operation described above, first, during the differential operating process in Step 707, there is performed a process shown in the flowchart in FIG. 13, thereby calculating a differential value at each sampling timing.

Also, during the second integrating process in Step 708, there is performed a process shown in the flowchart in FIG. 14, thereby integrating the absolute values of differential values at each sampling timing.

Figure 15:
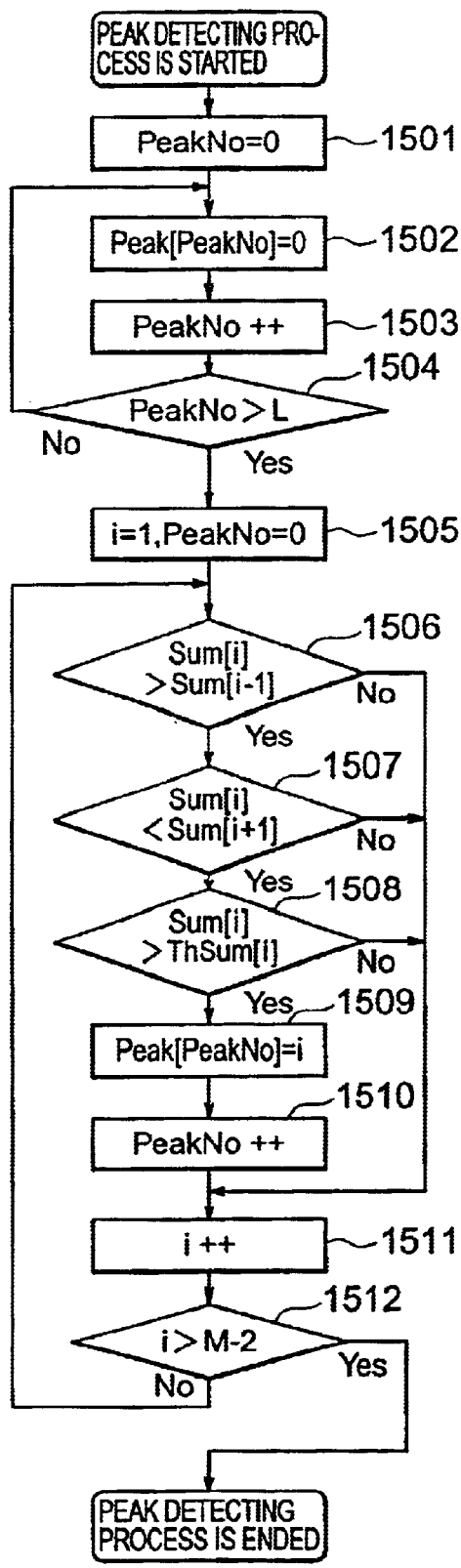
FIG. 15 is a flowchart showing a peak detecting process performed by the pulse radar device according to the first embodiment of the present invention.

Also, during the peak detecting process in Step 709, there is performed a process shown in the flowchart in FIG. 15, thereby obtaining each sampling timing, at which there is obtained an extremely large output, using the output from the second integrating process described above. There is outputted a sampling timing "Peak [PeakNo]", out of the obtained sampling timings, at which there is exceeded a preset detection threshold value ThSUm [i] at each sampling timing.

Figure 16:
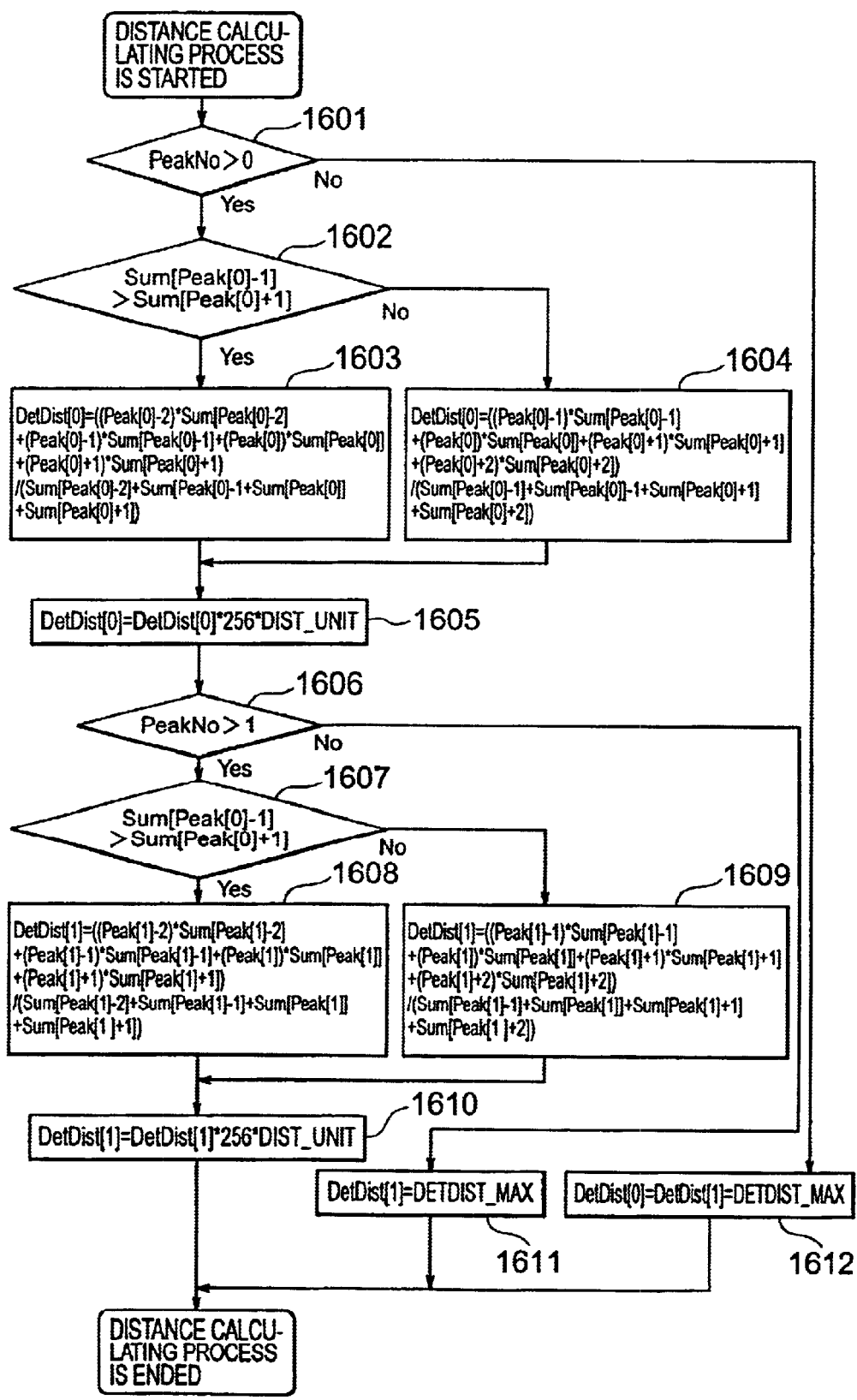
FIG. 16 is a flowchart showing a distance calculating process performed by the pulse radar device according to the first embodiment of the present invention.

During the following distance calculating process performed in Step 710, there is performed the processing shown in the flowchart in FIG. 16, thereby performing distance calculation.

That is, first, in Step 1601, it is judged whether "PeakNo" calculated during the peak detecting process is "0" or not. In the case where this "PeakNo" is "0", this indicates that there exists no peak exceeding the preset value, so that detection distances "DetDist [0]" and "DetDist [1]" are set as the maximum distance "DETDIST_MAX" in Step 1612.

On the other hand, in the case where "PeakNo" is greater than "0", in Step 1602, the second integration values at neighboring sampling timings on both sides of the first peak "Peak [0]" are compared with each other. In the case where the second integration value at the neighboring sampling timing on the left side is greater than the second integration value at the neighboring sampling timing on the right side, the processing proceeds to Step 1603.

In Step 1603, a weighted average is obtained using the second integration values at sampling timings of "Peak [0] −2", "Peak [0] −1", and "Peak [0] +1" in addition to "Peak [0]".

Also, in the case where the second integration value at the neighboring sampling timing on the left side is smaller than the second integration value at the neighboring sampling timing on the right side, the processing proceeds to Step 1604 in which a weighted average is obtained using the second integration values at sampling timings of "Peak [0] −1", "Peak [0] +1", and "Peak [0] +2" in addition to "Peak [0]".

Next, in Step 1605, there is performed multiplication by a distance "DIST_UNIT" corresponding to one sampling and there is performed multiplication by 256 in order to set the unit as [m/256].

Next, in Step 1606, it is judged whether there exists another peak and, if the judgment result is affirmative, the processing proceeds to Step 1607 in order to perform the same processing as above. In the case where there does not exist another peak, "DetTist [1]" is set as the maximum distance "DETDIST_MAX". Note that in this embodiment, there has been described a case where there are obtained peaks of up to two. However, the same processing is performed even in the case where three or more peaks are obtained.

Figure 17:
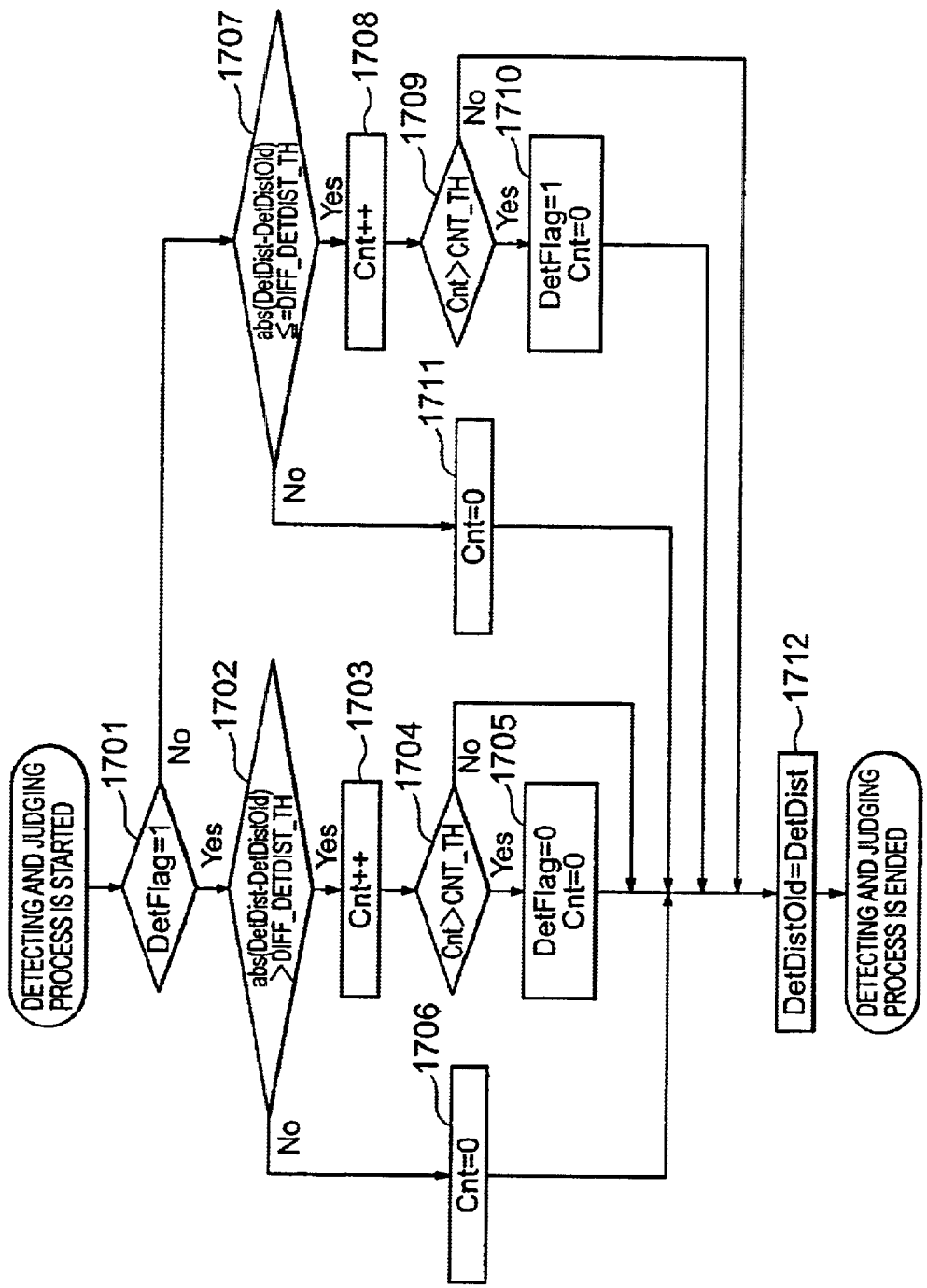
FIG. 17 is a flowchart showing a detecting and judging process performed by the pulse radar device according to the first embodiment of the present invention.

Further, during the detecting and judging process in Step 711, there is performed the counter processing shown in the flowchart in FIG. 17, thereby setting a detection flag only in the case where there is calculated a detection distance with a certain degree of stability. In this manner, there is prevented erroneous detection due to any noise.

As described above, with the technique of this first embodiment, there is detected a starting point of the changing of a magnitude of a signal at each sampling timing occurring due to a phase difference between a leakage signal component and a reflection signal component through differentiation, and there is calculated a distance to an object in the periphery by integrating its absolute value and performing detection. As a result, even if there exists a so-called leakage signal component, such as a leakage signal between transmission and reception or a reflection signal from a target, such as a radome, fixed onto the radar device, it becomes possible to correctly detect an object.

Also, interpolation is performed (weighted average is calculated) and a distance is calculated using the second integration value at a sampling timing, at which there is obtained a peak, and the second integration values at sampling timing before and after the sampling timing. As a result, even in the case of coarse sampling intervals, it becomes possible to improve the resolution of distance measurement.

Further, in accordance with the magnitude of a reception signal as a whole, there is adjusted its ground level. Therefore, a threshold value used during binarization is automatically set at an appropriate value. As a result, even in the case where a leakage signal component varies due to a variation of an attachment state, it becomes possible to use the present pulse radar device without making any special adjustment or change to the radar device.

Second Embodiment

Figure 18:
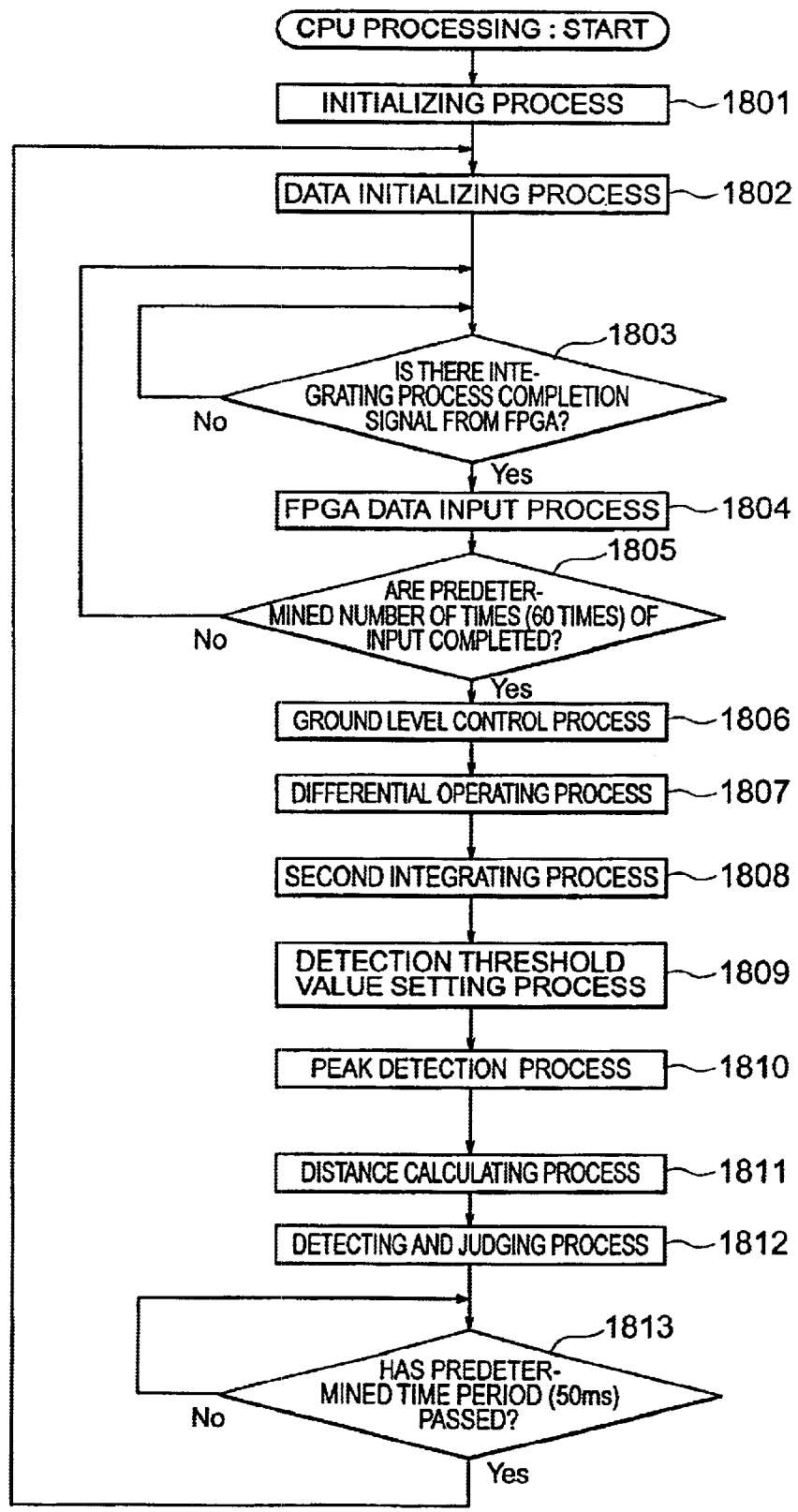
FIG. 18 is a flowchart showing an operation performed by a CPU of a pulse radar device according to a second embodiment of the present invention.

A pulse radar device according to a second embodiment of the present invention will be described with reference to the drawings. FIG. 18 is a flowchart showing the processing performed by the CPU of the pulse radar device according to the second embodiment of the present invention.

In this second embodiment, the processing within the CPU 500 in the first embodiment described above is changed and other portions, that is, the contents of the RF module 100, the adder circuit 200, the comparator circuit 300, and the FPGA 400 are the same as those in the first embodiment described above. The outline of the processing is shown in FIG. 18.

As shown in FIG. 18, first, in Step 1801, there is performed the initialization of the inside of the CPU 500.

Following this, in Step 1802, after the initialization of data is performed, there is waited for an integrating process completion signal to be sent from the FPGA 400 in Step 1803.

On receiving the integrating process completion signal from the FPGA 400, the processing proceeds to Step 1804 in which an integration result at each sampling timing is stored in a two-dimensionally arranged "FPGA[i][j]". Here, "i" is the sampling timing (i=0 to N; N is the number of bits of the shift register 421), and "j" is the order of storage (j=0 to 59; in the case where the number of times of integration by the second integrating means 520 is set as 60).

In Step 1805, if the number of times of reception of the integrating process completion signal from the FPGA 400 reaches a predetermined number of times (60 times, in this example), there are performed the operations in Step 1806 and in the following steps, that is, a ground level control process (Step 1806), a differential operating process (Step 1807), a second integrating process (Step 1808), a detection threshold value setting processing (Step 1809), a peak detecting process (Step 1810), a distance calculating process (Step 1811), and a detecting and judging process (Step 1812).

Following this, in Step 1813, it is confirmed whether there has passed 50 ms that is a processing period and, if the confirmation result is affirmative, the processing returns to Step 1802 and the same operation is repeated.

The differential operating process (Step 1807) that is a process differing from that in the first embodiment described above will be described below.

During this differential operating process (Step 1807), integration data from the FPGA 400 (first integrating process) is differentiated in a sampling direction.

Figure 19:
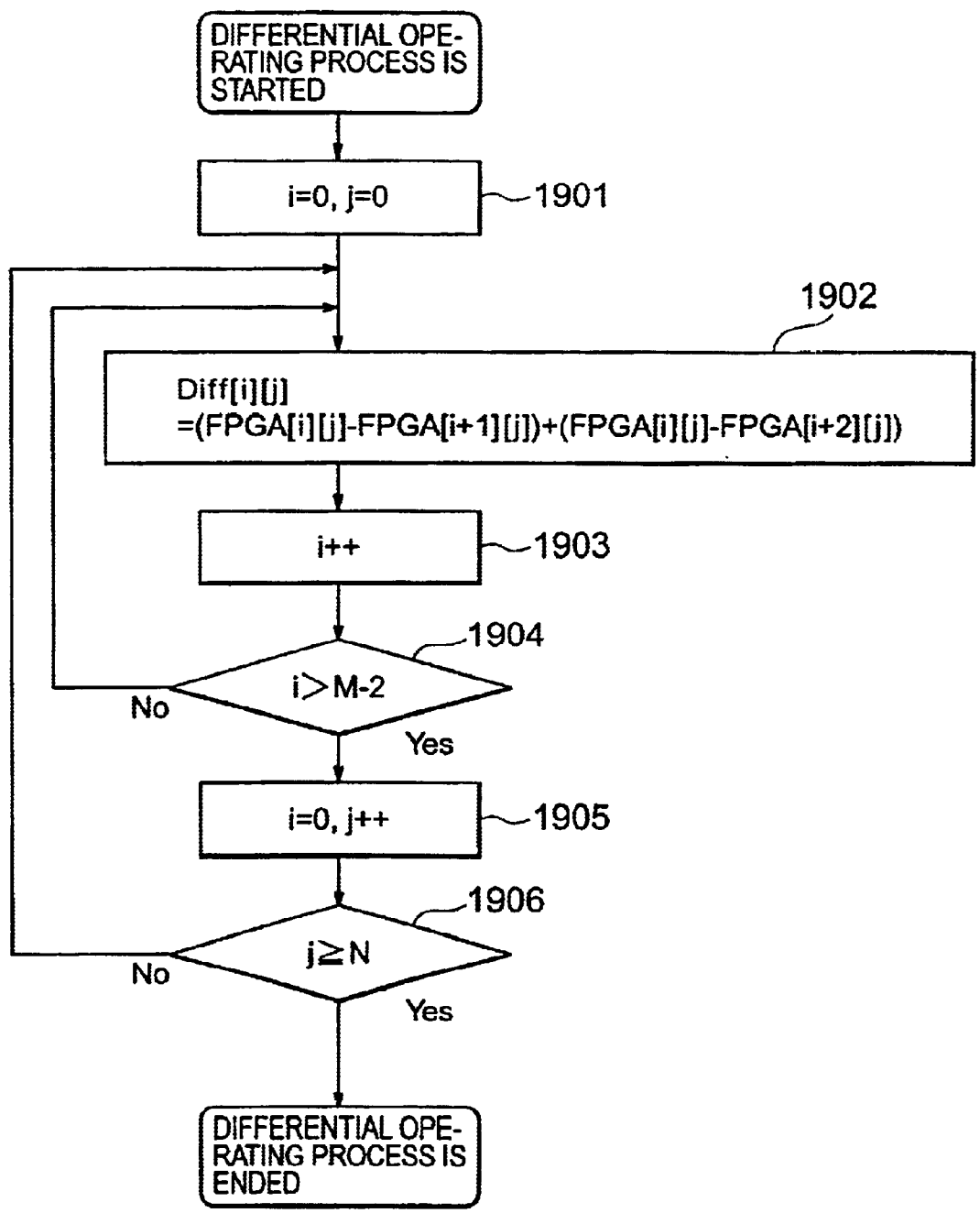
FIG. 19 is a flowchart showing a differential operating process performed by the pulse radar device according to the second embodiment of the present invention.

That is, there are obtained a difference between integration data at a sampling timing with interest and integration data at its neighboring sampling timing and a difference between the integration data at the sampling timing with interest and integration data at a sampling timing next to the neighboring sampling timing, and there is calculated a sum of these differences. By doing so, it becomes possible to improve a signal level with respect to a noise level, that is, an S/N ratio. In order to realize the operation described above, during the differential operating process, there is performed processing shown in the flowchart in FIG. 19, thereby calculating a differential value at each sampling timing.

Next, there will be described the detection threshold value setting process (Step 1809) and the peak detecting process (Step 1810).

These detection threshold value setting process and peak detecting process are the equivalent of the peak detecting process in the first embodiment described above and, even if a noise level is changed due to a change of the use environment of the radar device, there is automatically studied this changing and therefore it becomes possible to use the present device without making any special change.

Figure 20:
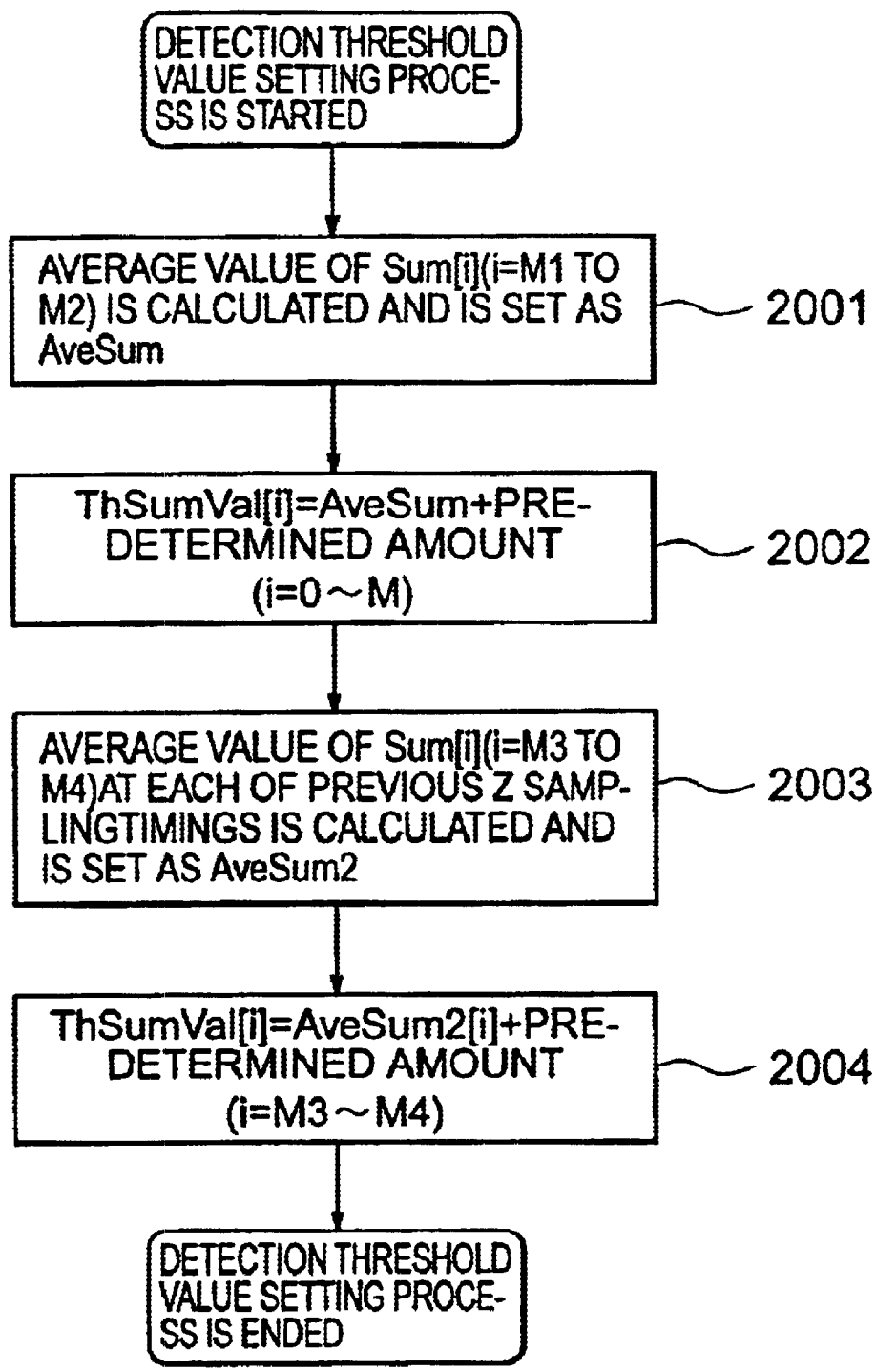
FIG. 20 is a flowchart showing a detection threshold value setting process performed by the pulse radar device according to the second embodiment of the present invention.

There will be described the detection threshold value setting process. During this process, as shown in FIG. 20, first, there is obtained an average value "AveSum" of differential integration values (outputs from the second integrating process) "Sum [i]" (note that i=M1 to M2) in Step 2001. As to M1 and M2, there are selected a range (extremely close distance), in which there is exerted no influence of the rising of a reception signal, and a range in which there exists normally no object. Also, a changing integration value at any one of the sampling timings may be set as "AveSum" as it is by setting as "M1=M2".

Next, in Step 2002, a predetermined value is added to the average value "AveSum", and an addition result is set as a detection threshold value "ThSumVal [i]" (i=0 to M). The magnitude of this value to be added may be preset in accordance with variations of a noise level or may be set by calculating the maximum values of variations of the average value "AveSum" and the variations of the differential integration value "Sum [i]" and using the maximum values.

Next, in Step 2003, in a range of from M3 to M4 in which there is exerted an influence of the rising of a reception signal, there is calculated an average value of values obtained at each of previous Z sampling timings and a calculation result is set as "AveSum2 [i]".

Next, in Step 2004, a predetermined value is added to the average value "AveSum2 [i]", and an addition result is set as a detection threshold value "ThSumVal [i]" (i=M3 to M4).

During the peak detecting process in Step 1810 in FIG. 18, there is performed a process in Step 1508 in FIG. 15 where "ThSum [i]" is changed to "ThSumVal [i]".

As described above, with the technique of this second embodiment, there are obtained a difference between an integration value at a sampling timing with interest and an integration value at its neighboring sampling timing and a difference between the integration value at the sampling timing with interest and an integration value at a sampling timing next to the neighboring sampling timing, and a sum of these differences is set as a differential value. By doing so, it becomes possible to improve a signal level with respect to a noise level, that is, an S/N ratio.

Also, a threshold value applied to a differential integration value is changed in accordance with variations of a noise level, so that even in the case where the use condition is changed due to a change of the use place and therefore a noise level is increased or decreased despite of the use of the same radar, it becomes possible to use the present pulse radar device without making any special adjustment or change to the radar device.

What is claimed is:

1. A pulse radar device comprising:
   a transmitting means for transmitting a pulse-shaped, radio wave;
   a receiving means for receiving a reflection wave generated by reflection of the radio wave transmitted from the transmitting means by an object and outputting a reception signal;
   a comparator means for converting the reception signal from the receiving means into a binary signal by comparing the reception signal with a preset and predetermined level;
   a first integrating means for sampling an output from the comparator means at predetermined time intervals from transmission and integrating results of a predetermined number of times of the sampling at each sampling timing;
   a differential operating means for, each time a predetermined time period has passed, reading results of the integrating by the first integrating means at each sampling timing and differentiating the read results of the integrating in a sampling direction;
   a second integrating means for integrating absolute values of a predetermined number of outputs from the differential operating means at each sampling timing;
   a peak detecting means for detecting a peak based on an output from the second integrating means;
   a distance measuring and detecting means for calculating a distance to the object and judging presence or absence of the object based on an output from the peak detecting means; and
   a timing control means for performing timing control for the transmission of the radio wave, the reception of the reflection wave, and signal processing.

2. A pulse radar device according to claim 1,
   wherein the differential operating means obtains a difference between outputs from the first integrating means at a sampling timing with interest and at a neighboring sampling timing thereof.

3. A pulse radar device according to claim 1,
   wherein the differential operating means obtains a difference between outputs from the first integrating means at a sampling timing with interest and at a neighboring sampling timing and a difference between outputs from the first integrating means at the sampling timing with interest and at a sampling timing next to the neighboring sampling timing, and obtains a sum of the differences.

4. A pulse radar device according to claim 1,
   wherein the peak detecting means outputs each sampling timing, out of sampling timings at each of which a result of the integrating by the second integrating means at each sampling timing becomes extremely large, at which a result of the integrating exceeds a preset value.

5. A pulse radar device according to claim 1, further comprising a detection threshold value setting means for setting a detection threshold value based on a result of the integrating of the second integrating means,
   wherein the peak detecting means outputs each sampling timing, out of sampling timings at each of which a result of the integrating by the second integrating means at each sampling timing becomes extremely large, at which a result of the integrating exceeds the detection threshold value set by the detection threshold value setting means.

6. A pulse radar device according to claim 5,
   wherein the detection threshold value setting means obtains a mean value of a predetermined number of previous results of the integrating by the second integrating means at each sampling timing and sets the mean value as a noise level at each specific sampling timing, obtains a mean value of results of the integrating by the second integrating means at at least one sampling timing and sets the mean value as the noise level at each sampling timing other than the specific sampling timing, and calculates the detection threshold value based on the noise levels.

7. A pulse radar device according to claim 4,
   wherein the distance measuring and detecting means includes:
   a distance calculating means for calculating a distance based on a result of the integrating by the second integrating means at the sampling timing outputted from the peak detecting means and results of the integrating by the second integrating means at sampling timings before and after the outputted sampling timing; and
   a detecting and judging means for judging whether an object exists based on a result of the calculation by the distance calculating means.

8. A pulse radar device according to claim 1, further comprising a ground level changing means for changing a ground level of the reception signal from the receiving means based on a result of the integrating by the first integrating means.

9. A pulse radar device according to claim 8, further comprising a ground level control means for obtaining a mean value of results of the integrating by the first integrating means at each sampling timing and, if the mean value exceeds a predetermined range, outputting a signal for changing the ground level to the ground level changing means.

10. A pulse radar device according to claim 2,
wherein the peak detecting means outputs each sampling timing, out of sampling timings at each of which a result of the integrating by the second integrating means at each sampling timing becomes extremely large, at which a result of the integrating exceeds a preset value.

11. A pulse radar device according to claim 3,
wherein the peak detecting means outputs each sampling timing, out of sampling timings at each of which a result of the integrating by the second integrating means at each sampling timing becomes extremely large, at which a result of the integrating exceeds a preset value.

12. A pulse radar device according to claim 2, further comprising a detection threshold value setting means for setting a detection threshold value based on a result of the integrating of the second integrating means,
wherein the peak detecting means outputs each sampling timing, out of sampling timings at each of which a result of the integrating by the second integrating means at each sampling timing becomes extremely large, at which a result of the integrating exceeds the detection threshold value set by the detection threshold value setting means.

13. A pulse radar device according to claim 3, further comprising a detection threshold value setting means for setting a detection threshold value based on a result of the integrating of the second integrating means,
wherein the peak detecting means outputs each sampling timing, out of sampling timings at each of which a result of the integrating by the second integrating means at each sampling timing becomes extremely large, at which a result of the integrating exceeds the detection threshold value set by the detection threshold value setting means.

14. A pulse radar device according to claim 5,
wherein the distance measuring and detecting means includes:
a distance calculating means for calculating a distance based on a result of the integrating by the second integrating means at the sampling timing outputted from the peak detecting means and results of the integrating by the second integrating means at sampling timings before and after the outputted sampling timing; and
a detecting and judging means for judging whether an object exists based on a result of the calculation by the distance calculating means.

15. A pulse radar device according to claim 6,
wherein the distance measuring and detecting means includes:
a distance calculating means for calculating a distance based on a result of the integrating by the second integrating means at the sampling timing outputted from the peak detecting means and results of the integrating by the second integrating means at sampling timings before and after the outputted sampling timing; and
a detecting and judging means for judging whether an object exists based on a result of the calculation by the distance calculating means.

16. A pulse radar device according to claim 2, further comprising a ground level changing means for changing a ground level of the reception signal from the receiving means based on a result of the integrating by the first integrating means.

17. A pulse radar device according to claim 3, further comprising a ground level changing means for changing a ground level of the reception signal from the receiving means based on a result of the integrating by the first integrating means.

18. A pulse radar device according to claim 4, further comprising a ground level changing means for changing a ground level of the reception signal from the receiving means based on a result of the integrating by the first integrating means.

19. A pulse radar device according to claim 5, further comprising a ground level changing means for changing a ground level of the reception signal from the receiving means based on a result of the integrating by the first integrating means.

20. A pulse radar device according to claim 6, further comprising a ground level changing means for changing a ground level of the reception signal from the receiving means based on a result of the integrating by the first integrating means.

* * * * *